US012810173B2

(12) United States Patent
Yonetani et al.

(10) Patent No.: US 12,810,173 B2
(45) Date of Patent: Nov. 24, 2026

(54) INTEGRATED ANALYSIS METHOD, INTEGRATED ANALYSIS APPARATUS, AND COMPUTER-READABLE STORAGE MEDIUM STORING AN INTEGRATED ANALYSIS PROGRAM

(71) Applicant: OMRON Corporation, Kyoto (JP)

(72) Inventors: Ryo Yonetani, Tokyo (JP); Masaki Suwa, Tokyo (JP)

(73) Assignee: OMRON Corporation, Kyoto (JP)

( * ) Notice: Subject to any disclaimer, the term of this patent is extended or adjusted under 35 U.S.C. 154(b) by 940 days.

(21) Appl. No.: 17/772,157

(22) PCT Filed: Nov. 2, 2020

(86) PCT No.: PCT/JP2020/041004
§ 371 (c)(1),
(2) Date: Apr. 27, 2022

(87) PCT Pub. No.: WO2021/090789
PCT Pub. Date: May 14, 2021

(65) Prior Publication Data
US 2022/0405604 A1 Dec. 22, 2022

(30) Foreign Application Priority Data
Nov. 7, 2019 (JP) ................................ 2019-202716

(51) Int. Cl.
*G06N 5/022* (2023.01)
*G06T 7/00* (2017.01)

(52) U.S. Cl.
CPC ........... *G06N 5/022* (2013.01); *G06T 7/0004* (2013.01); *G06T 2207/20081* (2013.01)

(58) Field of Classification Search
CPC ...... G06N 5/022; G06N 20/00; G06T 7/0004; G06T 2207/20081; G06F 18/23; G06F 9/5005; G06F 18/2135; G06V 10/77
See application file for complete search history.

(56) References Cited

U.S. PATENT DOCUMENTS 9,317,740 B2 * 4/2016 Ricanek, Jr. ............ G06T 11/26
2003/0004909 A1 * 1/2003 Chauhan ................ G06N 5/022 706/45

(Continued)

FOREIGN PATENT DOCUMENTS

CN 109444682 A 3/2019
JP H07-219581 A 8/1995

(Continued)

OTHER PUBLICATIONS

The Chinese Office Action issued on Sep. 5, 2024 in counterpart Chinese patent application No. 202080073286.X.

(Continued)

*Primary Examiner* — Jennifer N Welch
*Assistant Examiner* — Amy P Hoang
(74) *Attorney, Agent, or Firm* — METROLEX IP LAW GROUP, PLLC; Robert L. Scott, Esq.

(57) ABSTRACT

An integrated analysis method according to one or more embodiments may include: a step of each client apparatus executing computation for obtaining correlation between elements in local samples included in the local learning data; a step of a server apparatus acquiring results of the computation by the client apparatuses; a step of the server apparatus calculating an integration result indicating the correlation between elements of all of the local samples of all of the local learning data, by integrating the results of computation acquired from the client apparatuses; a step of the server apparatus deriving one or more principal components from the calculated integration result by performing princi- (Continued)

pal component analysis; and a step of the server apparatus outputting information regarding the one or more derived principal components.

17 Claims, 24 Drawing Sheets

(56) References Cited

U.S. PATENT DOCUMENTS

| | | | | |
|---|---|---|---|---|
| 2005/0014195 | A1* | 1/2005 | Vauterin | G16B 40/00 435/7.1 |
| 2012/0166394 | A1* | 6/2012 | Kim | G06F 16/184 707/634 |
| 2016/0001355 | A1* | 1/2016 | Chowdhary | B22C 19/04 700/204 |
| 2019/0166030 | A1 | 5/2019 | Chen et al. | |
| 2020/0234425 | A1* | 7/2020 | Furuichi | G01N 29/4481 |
| 2021/0058362 | A1* | 2/2021 | Kondo | G06N 20/00 |
| 2022/0058524 | A1* | 2/2022 | Kudinov | G06N 20/00 |

FOREIGN PATENT DOCUMENTS

| | | | |
|---|---|---|---|
| JP | 2002-24825 | A | 1/2002 |
| JP | 2017-219529 | A | 12/2017 |

OTHER PUBLICATIONS

Kenta Toyota et al., "Automatic specification of faulty points using a subspace method and robust statistics", SSII 2016, Jun. 10, 2016, IS3-22; Concise explanation of relevance provided in the specification.

English translation of the International Search Report ("ISR") of PCT/JP2020/041004 mailed on Jan. 19, 2021.

The Written Opinion("WO") of PCT/JP2020/041004 mailed on Jan. 19, 2021.

Andreas Grammenos et al: "Federated PCA with Adaptive Rank Estimation", arxiv.org, Cornell University Library, Jul. 18, 2019, p. 1-19, https://arxiv.org/abs/1907.08059v1, Ithaca, NY; Cited in EESR issued on Apr. 19, 2023 in a counterpart European patent application.

Wen M.A. et al: "A Distributed and Incremental SVD Algorithm for Agglomerative Data Analysis on Large Networks", arxiv.org, Cornell University Library, Jan. 26, 2016, p. 1-14, https://arxiv.org/abs/1601.07010v1, Ithaca, NY; Cited in EESR issued on Apr. 19, 2023 in a counterpart European patent application.

The extended European search report (EESR) issued on Apr. 19, 2023 in a counterpart European patent application.

* cited by examiner 252 252 250

| IMPORTANCE | SAMPLE NAME | ☑ ELEMENT A | ☐ ELEMENT B | ... |
|---|---|---|---|---|
| ★★★★★ | SAMPLE A | *** | *** | ... |
| ★☆☆☆☆ | SAMPLE B | *** | *** | ... |
| ⋮ | ⋮ | ⋮ | ⋮ | ⋮ |

251
251

INTEGRATED ANALYSIS METHOD, INTEGRATED ANALYSIS APPARATUS, AND COMPUTER-READABLE STORAGE MEDIUM STORING AN INTEGRATED ANALYSIS PROGRAM

TECHNICAL FIELD

The disclosure relates to an integrated analysis method, an integrated analysis apparatus, and a computer-readable medium storing an integrated analysis program.

RELATED ART

Principal component analysis can be used in various applications for analyzing data. For example, by using principal component analysis, features of multidimensional data can be extracted, and the information amount of the data can be reduced by compression. Also, by using subspaces obtained by principal component analysis, predetermined inference such as class identification (subspace method) can be performed on object data, for example. A method of determining the quality of a product captured in an observation image using a subspace method is proposed in Non-Patent Document 1, as an example of predetermined inference.

RELATED ART DOCUMENT

Non-Patent Document

Non-Patent Document 1: Kenta Toyota and Kazuhiro Hotta "Automatic specification of faulty points using a subspace method and robust statistics", SSII 2016, IS3-22, Jun. 10, 2016.

SUMMARY

The known method using principal component analysis may have the following problems. That is, learning data on which principal component analysis is performed is separately collected. It may be desirable that individual users collect a sufficient amount of learning data. However, it is costly and difficult to collect a sufficient amount of learning data separately. Therefore, when learning data is separately collected, it is possible that unbalance in samples is likely to occur, and the quality of data analysis by principal component analysis is not sufficient. For example, in the case of the aforementioned data compression, the quality of a compression model obtained by principal component analysis may be insufficient, and it may be possible that actually useful information (e.g., useful information for a task of another user) is deleted. Also, in a case where the aforementioned predetermined inference is performed, it may be possible that information useful for inference is not considered, and the accuracy of the inference is insufficient, for example.

Therefore, it is conceivable that pieces of learning data collected separately are gathered in one system constituted by one or more computers in order to secure a sufficient amount of learning data. However, it involves huge cost (e.g., communication cost) for data exchange to gather learning data that is separately collected. Also, if principal component analysis is performed on the gathered large amount of learning data, problems may occur such as an increase in calculation cost, the memory used in a calculation process being insufficient, and the calculation process being not complete in a predetermined period of time.

One or more embodiments provide a technique for improving the quality of data analysis by principal component analysis while suppressing an increase in cost.

One or more embodiments may adopt the following configurations.

That is, an integrated analysis method according to one or more embodiments may include: a step of each of a plurality of client apparatuses executing computation, on local learning data, for obtaining correlation between elements in local samples included in the local learning data; a step of a server apparatus acquiring results of the computation from the client apparatuses; a step of the server apparatus calculating an integration result indicating the correlation between elements of all of the local samples of all of the local learning data, by integrating the results of computation acquired from the client apparatuses; a step of the server apparatus deriving one or more principal components from the calculated integration result by performing principal component analysis; and a step of the server apparatus outputting information regarding the one or more derived principal components.

In the integrated analysis method according to this configuration, instead of the local learning data itself, results of computation regarding a correlation between the elements of local samples included in local learning data are gathered in a server apparatus. With this, the cost of exchanging data between the client apparatuses and the server apparatus may be reduced. Also, the client apparatuses performs some of the series of calculation processes for deriving one or more principal components from all of the local learning data. With this, the local learning data that is separately collected can be reflected on the principal component analysis, and the calculation cost of the server apparatus may be reduced. Therefore, according to this configuration, the quality of data analysis by principal component analysis may be improved while suppressing an increase in cost.

Note that the computation result regarding the correlation between the elements of local learning data may be in any format, as long as the computation result is not the local learning data itself and the principal components of all of the local learning data can be derived therefrom. The computation result may be constituted by an autocorrelation matrix of local learning data, for example. Also, the integration result format is not limited in particular, as long as being obtained in the process of deriving the principal components of all of the local learning data. The integration result may be constituted by a variance-covariance matrix or a correlation coefficient matrix, for example.

In the integrated analysis method according to the aforementioned one aspect, the computation for obtaining correlation may include: a step of acquiring average values of respective elements of all of the local samples included in all of the local learning data; a step of normalizing (centralizing) the local samples included in the local learning data by subtracting the acquired average values from the values of the elements of the local samples; and a step of calculating autocorrelation matrices of the local learning data from the normalized local samples. Acquiring the results of computation may include acquiring the calculated autocorrelation matrices. Integrating the results of computation may include obtaining the sum of the autocorrelation matrices acquired from the client apparatuses. According to this configuration, one or more principal components of all of the local learning data can be appropriately derived.

The integrated analysis method according to the aforementioned one aspect may further include a step of the client apparatuses receiving a designation of importances of the local samples. The local samples may be weighted according to the designated importances. The average values of the elements of all of the local samples may be weighted average values that are weighted according to the importances. In the step of calculating, the server apparatus may calculate a variance-covariance matrix of all of the local learning data as the integration result, by dividing the sum of the autocorrelation matrices by the sum of weights according to the importances. According to this configuration, as a result of reflecting the importances of the local samples that are designated in the client apparatuses on principal component analysis, the quality of data analysis by principal component analysis can be improved.

In the integrated analysis method according to the aforementioned one aspect, the average values of the elements of all of the local samples may be calculated by secret calculation using the number of the local samples and the average values of the respective elements that are obtained from each client apparatus. If the number of local samples and the average values of the elements are made public, the confidentiality of the local learning data may be lost. According to this configuration, as a result of using secret calculation, the average values of the elements of all of the local samples can be obtained while the number of local samples and the average values of the elements being concealed. Therefore, according to this configuration, in the series of calculation processes for deriving one or more principal components from all of the local learning data, the confidentiality of the local learning data can be secured.

In the integrated analysis method according to the aforementioned one aspect, the integration of the results of computation may be performed by secret calculation. According to this configuration, in the series of calculation processes for deriving one or more principal components from all of the local learning data, the confidentiality of the local learning data can be secured.

The integrated analysis method according to the aforementioned one aspect may further include a step of the client apparatuses receiving a designation of two or more elements from a plurality of elements that constitute the local samples. In the step of calculating, the server apparatus may calculate the integration result by integrating the results of computation acquired from the client apparatuses, regarding the two or more designated elements. In the deriving step, the server apparatus may derive one or more principal components from the calculated integration result by performing principal component analysis, regarding the two or more designated elements. According to this configuration, principal component analysis can be performed regarding the elements designated in the client apparatuses.

The integrated analysis method according to the aforementioned one aspect may further include a step of the server apparatus assigning each client apparatus to at least one of a plurality of groups, based on the matching degree of the designated two or more elements. In the step of calculating, the server apparatus may calculate the integration result by integrating the results of computation acquired from the client apparatuses in the same group, regarding the two or more designated elements. In the deriving step, the server apparatus may derive one or more principal components from the integration result calculated in the same group, regarding the two or more designated elements, by performing principal component analysis. According to this configuration, grouping of the client apparatuses are performed based on the designated elements, and principal component analysis can be performed for each group.

The integrated analysis method according to the aforementioned one aspect may further include a step of the server apparatus assigning each client apparatus to at least one of a plurality of groups. In the step of calculating, the server apparatus may calculate the integration result by integrating the results of computation acquired from the client apparatuses in the same group. In the deriving step, the server apparatus may derive one or more principal components from the integration result calculated in the same group, by performing principal component analysis. According to this configuration, grouping of the client apparatuses can be performed, and principal component analysis can be performed for each group.

In the integrated analysis method according to the aforementioned one aspect, in the assigning step, the server apparatus may distribute a list indicating the plurality of groups to each client apparatus, cause the client apparatus to select at least one group from the plurality of groups shown in the list, and assign the client apparatus to the selected at least one group. According to this configuration, grouping of the client apparatuses can be performed with a simple method.

In the integrated analysis method according to the aforementioned one aspect, the server apparatus may acquire attribute data regarding the local learning data from the client apparatuses, perform clustering on the attribute data acquired from the client apparatuses, and assign each client apparatus to at least one of the plurality of groups based on the clustering result. According to this configuration, grouping of the client apparatuses can be performed based on the attribute of local learning data.

In the integrated analysis method according to the aforementioned one aspect, outputting information regarding the one or more principal components may include the server apparatus distributing information regarding the one or more derived principal components to the client apparatuses. According to this configuration, in the client apparatuses, the result of principal component analysis performed on all of the local learning data can be used.

In the integrated analysis method according to the aforementioned one aspect, the local learning data may be constituted by image data of images of products or measurement data obtained by measuring the attributes of products. According to this configuration, with respect to data that can be used for visual inspection of products, the quality of data analysis by principal component analysis can be improved while suppressing an increase in cost.

In the integrated analysis method according to the aforementioned one aspect, the local learning data may be constituted by sensing data obtained by a sensor that observes the states of subjects. According to this configuration, with respect to data that can be used for estimating the states of subjects, the quality of data analysis by principal component analysis can be improved while suppressing an increase in cost.

Also, as another aspect of the integrated analysis method according to the modes described above, one or more embodiments may include a computer system constituted by the above-described client apparatuses and server apparatus. Alternatively, one or more embodiments may include one of one or more apparatuses that realize all of or some of the configurations described above, an information processes method executed by the apparatuses, a program, and a storage medium that can be read by an apparatus such as a computer, a machine, or the like, and stores such a program. Here, the storage medium that can be read by a computer or the like is a medium that stores information such as programs via an electrical, magnetic, optical, mechanical or chemical effect.

For example, an integrated analysis apparatus according to one or more embodiments may include: an acquisition unit configured to acquire, from each of a plurality of client apparatuses, a result of computation executed on local learning data collected by the client apparatus, the computation being for obtaining correlation between elements in local samples included in the local learning data; an integration unit configured to calculate an integration result indicating the correlation between elements of all of the local samples included in all of the local learning data, by integrating the results of computation acquired from the client apparatuses; an analysis unit configured to derive one or more principal components from the calculated integration result by performing principal component analysis; and an output unit configured to output information regarding the one or more derived principal components.

Also, for example, an integrated analysis program according to one or more embodiments may include a program for causing a computer to execute: a step of acquiring, from each of a plurality of client apparatuses, a result of computation executed on local learning data collected by the client apparatus, the computation being for obtaining the correlation between elements in local samples included in the local learning data; a step of calculating an integration result indicating the correlation between elements of all of the local samples included in all of the local learning data, by integrating the results of computation acquired from the client apparatuses; a step of deriving one or more principal components from the calculated integration result by performing principal component analysis; and a step of outputting information regarding the one or more derived principal components.

According to one or more embodiments, the quality of data analysis by principal component analysis may be improved while suppressing an increase in cost.

DETAILED DESCRIPTION

Hereinafter, an embodiment according to one aspect of the present invention (also referred to as "the present embodiment" below) will be described based on the drawings. However, the embodiment described below is merely an example of the present invention in every respect. Needless to say, various improvements and modifications may be made without departing from the scope of the present invention. That is to say, to implement the present invention, a specific configuration corresponding to that implementation may also be employed as appropriate. Note that, although data that is used in the embodiment is described using natural language, more specifically, the data is defined by pseudo-language, such data may be given by commands, parameters, machine language, or the like that can be recognized by a computer.

1. Application Example

Figure 1:
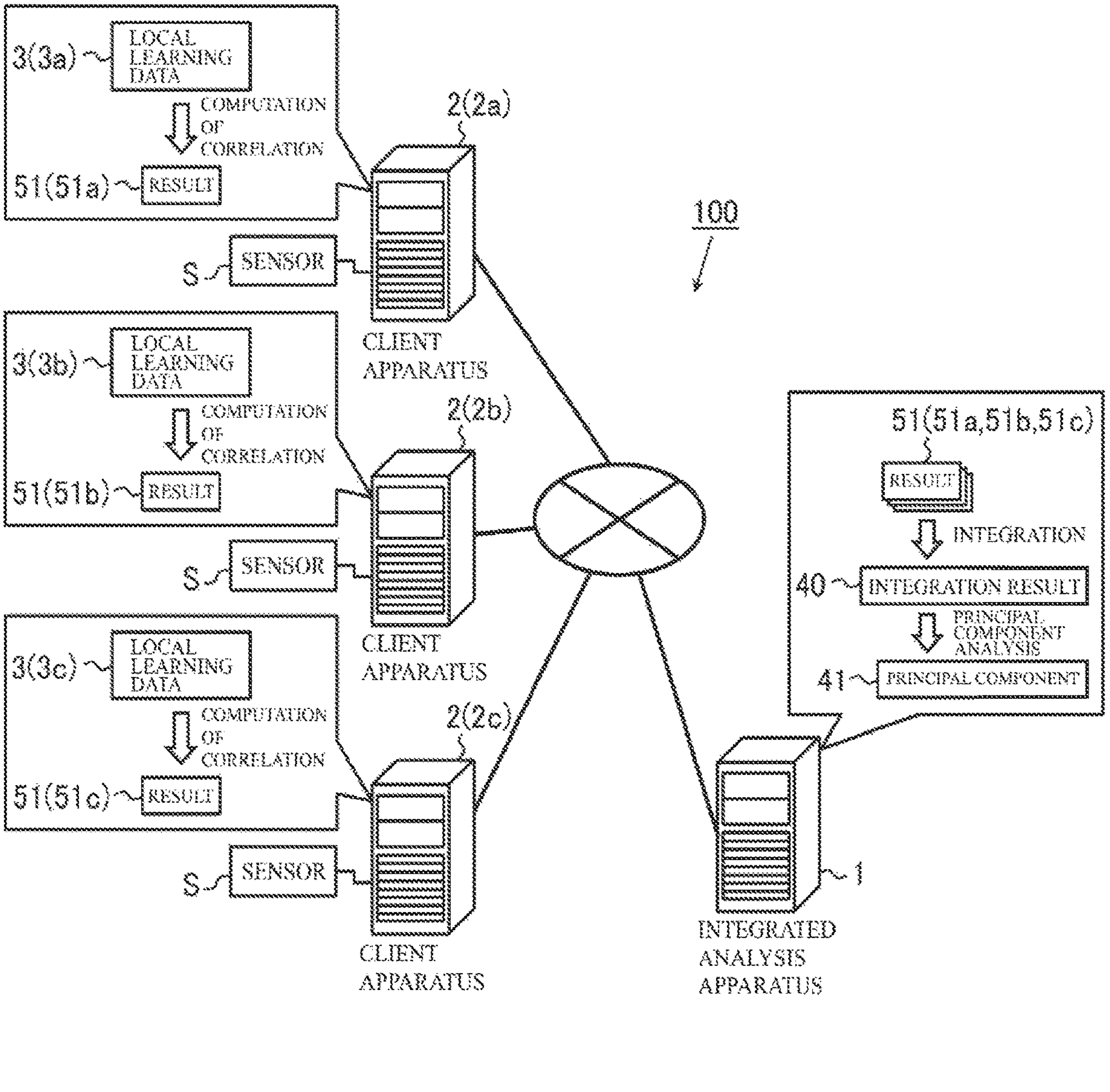
FIG. 1 is a schematic diagram illustrating an example of a scenario to which one or more embodiments is applied.

FIG. 1 schematically illustrates an example of a scenario to which the present invention is applied. As shown in FIG. 1, a system 100 according to the present embodiment includes an integrated analysis apparatus 1 and a plurality of client apparatuses 2.

Each client apparatus 2 is a computer configured to collect local learning data 3. There is no particular limitation to the type of the local learning data 3, which may be selected as appropriate according to the embodiment, as long as the local learning data 3 may serve as an object on which principal component analysis can be performed. The local learning data 3 may be image data, sound data, numerical data, text data, or measurement data of various sensors, for example. In the following, measurement data obtained by a sensor may also be referred to as "sensing data".

In the present embodiment, each client apparatus 2 can collect local learning data 3 using a sensor S. The sensor S may be an image sensor (camera), an infrared sensor, a sound sensor (microphone), an ultrasonic sensor, an optical sensor, a pressure sensor, an atmospheric pressure sensor, a temperature sensor, for example. Also, the sensor S may be an environment sensor, a vital sensor, a medical examination apparatus, an in-vehicle sensor, or a home security sensor, for example. The environment sensor may be a barometer, a thermometer, a hygrometer, a sound pressure sensor, a sound sensor, an ultraviolet sensor, an illumination meter, a precipitation gauge, a gas sensor, for example. The vital sensor may be a blood-pressure gauge, a pulsimeter, a heart rate meter, an electrocardiographic monitor, an electromyograph, a clinical thermometer, an electro dermal activity sensor, a microwave sensor, an electroencephalograph, a magnetoencephalograph, an activity tracker, a glucometer, an ocular potentiometer, or an eye movement measuring instrument, for example. The medical examination apparatus may be a CT (computed tomography) apparatus, or an MRI (magnetic resonance imaging) apparatus, for example. The in-vehicle sensor may be an image sensor, a Lidar (light detection and ranging) sensor, a millimeter-wave radar, an ultrasonic sensor, or an acceleration sensor, for example. The home security sensor may be an image sensor, an infrared sensor, an activity (sound) sensor, a gas (e.g., $CO_2$) sensor, a current sensor, or a smart meter (sensor for measuring a power usage amount of a home electric appliance, illumination, or the like), for example.

The local learning data 3 is constituted by a plurality of local samples. Each local sample includes a plurality of elements. The elements of a sample may be directly obtained from data, such as pixels of image data, or may be obtained by executing some information processes on data, as in the case of the size of an object captured in image data (that is, indirectly obtained from data).

Each client apparatus 2 executes, on the local learning data 3, computation for obtaining a correlation between elements of local samples included in local learning data 3. Accordingly, the client apparatus 2 generates a result 51 of a computation regarding a correlation between the elements of the local learning data 3. The result 51 of this computation may be in any format, as long as the result 51 is not the local learning data 3 itself, and can be used for principal component analysis.

The integrated analysis apparatus 1 is a computer configured to perform principal component analysis. The integrated analysis apparatus 1 is an example of a "server apparatus" of the present invention. The integrated analysis apparatus 1 acquires computation results 51 from the client apparatuses 2. The integrated analysis apparatus 1 calculates an integration result 40 indicating the correlation between elements in all of the local samples included in all of the local learning data by integrating the computation results 51 acquired from the client apparatuses 2. "All of the local learning data" means all of the local learning data 3 that are obtained by the client apparatuses 2 and are to be subjected to principal component analysis. "All of the local samples" means all of the local samples that are to be subjected to the principal component analysis. The format of the integration result 40 may be determined as appropriate so as to be usable in the principal component analysis.

The integrated analysis apparatus 1 derives one or more principal components 41 from the calculated integration result 40 by performing principal component analysis. The details of computation of the principal component analysis, that is, the method of deriving the principal components 41 may be selected as appropriate. A known method such as singular value decomposition, eigenvalue decomposition, or KL expansion may be adopted as the method of deriving the principal components 41.

The integrated analysis apparatus 1 outputs the one or more derived principal components 41. The output format and usage of the principal components 41 may be selected as appropriate. In the present embodiment, the one or more derived principal components 41 may be provided to the client apparatuses 2. Accordingly, the client apparatuses 2 can use the one or more principal components 41 derived from all of the local learning data in various applications such as data compression and predetermined inference, for example.

"Inference" may also be referred to as "estimation". Making an inference may be one of deriving a discrete value (e.g., a class corresponding to a specific feature) by grouping (sorting, identification) and deriving a continuous value (e.g., a probability that a specific feature appears) by regression, for example. Making an inference may also include performing some kind of recognition such as detection or determination based on the result of grouping or regression. Also, making an inference may also include a prediction.

Also, the name of the system 100 may be changed as appropriate according to the information processes to be executed in the system 100, the usage mode of principal components 41, or the like. The system 100 may be referred to as an analysis system, a compression system, an inference system, or the like. When the derived principal components 41 are used for inference, in a computer in the system 100, the name of the system 100 may be changed as appropriate according to the contents of inference, such as an inspection system, a monitoring system, a diagnostic system, a detection system, or an estimation system. Similarly, the client apparatus 2 may be referred to as a compression apparatus, an inference apparatus, or the like. When the derived principal components 41 are used for inference in a client apparatus 2, the name of the client apparatus 2 may be changed as appropriate according to the contents of inference, such as an inspection apparatus, a monitoring apparatus, a diagnosis apparatus, a detection apparatus, or an estimation apparatus, for example.

As described above, in the present embodiment, instead of local learning data 3 itself, the results 51 of computation regarding a correlation between the elements of local samples included in the local learning data 3 are gathered in the integrated analysis apparatus 1. Accordingly, the cost of exchanging data between the client apparatuses 2 and the integrated analysis apparatus 1 can be reduced. Also, the client apparatuses 2 can be caused to perform some of the series of calculation processes for deriving one or more principal components 41 from all of the local learning data. Accordingly, the local learning data 3 separately collected by the client apparatuses 2 can be reflected on the principal component analysis, and the calculation cost of the integrated analysis apparatus 1 can be reduced. Therefore, according to the present embodiment, the quality of data analysis by principal component analysis can be improved while suppressing an increase in cost.

Note that, in the example in FIG. 1, there are three client apparatuses 2*a* to 2*c* in the system 100. In the following, for the sake of description, further reference signs such as a, b, and c are added when the client apparatuses are distinguished, and when the client apparatuses are not distinguished, these reference signs are omitted such as "client apparatus 2". The client apparatuses 2*a* to 2*c* respectively collect local learning data 3*a* to 3*c*, and generate results 51*a* to 51*c* of computation regarding a correlation between the elements of the local learning data 3*a* to 3*c*. The generated computation results 51*a* to 51*c* are gathered in the integrated analysis apparatus 1. The integrated analysis apparatus 1 calculates an integration result 40 from the computation results 51*a* to 51*c*, and derives one or more principal components 41 from the calculated integration result 40. Accordingly, the integrated analysis apparatus 1 can derive one or more principal components 41 regarding the local learning data 3*a* to 3*c* collected by the three client apparatuses 2*a* to 2*c*. Note that the number of client apparatuses 2 is not limited to three, and may be any number.

Also, in the example in FIG. 1, the integrated analysis apparatus 1 and the client apparatuses 2 are connected to each other via a network. The type of the network may be selected as appropriate from the Internet, a wireless communication network, a mobile communication network, a telephone network, a dedicated network, and the like. Note that the method of exchanging data between the integrated analysis apparatus 1 and the client apparatuses 2 is not limited to this example, and may be selected as appropriate according to the embodiment. For example, data may be exchanged between the integrated analysis apparatus 1 and the client apparatuses 2 using a storage medium, an external storage apparatus, or the like.

Also, in the example in FIG. 1, the integrated analysis apparatus 1 and the client apparatuses 2 are each constituted by one computer. However, the configuration of the system 100 according to the present embodiment is not limited to this example, and may be determined as appropriate according to the embodiment. For example, at least one of the integrated analysis apparatus 1 and the client apparatuses 2 may be constituted by a plurality of computers.

2. Exemplary Configuration

[Hardware Configuration]

<Integrated Analysis Apparatus>

Figure 2:
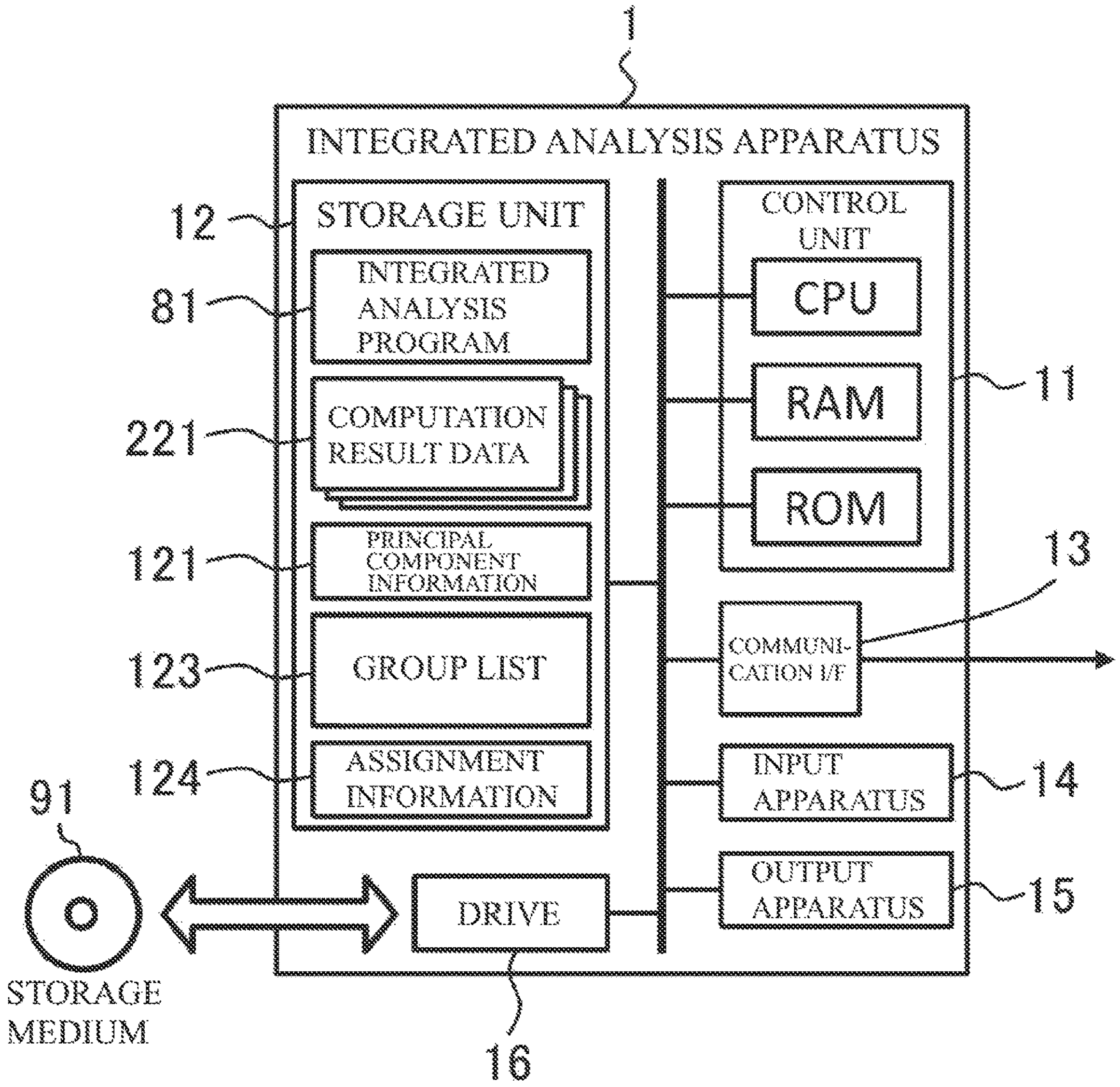
FIG. 2 is a schematic diagram illustrating an example of a hardware configuration of an integrated analysis apparatus according to embodiment one or more embodiments.

FIG. 2 schematically illustrates an example of a hardware configuration of the integrated analysis apparatus 1 according to the present embodiment. As shown in FIG. 2, the integrated analysis apparatus 1 according to the present embodiment is a computer in which a control unit 11, a storage unit 12, a communication interface 13, an input apparatus 14, an output apparatus 15, and a drive 16 are electrically connected. Note that, in FIG. 2, the interface is denoted as "communication I/F".

The control unit 11 includes a CPU (central processing unit), which is a hardware processor, a RAM (random access memory), ROM (read only memory), and the like, and is configured to execute information processes based on a program and various types of data. The storage unit 12 is an example of a memory, and is constituted by a hard disk drive, a solid-state drive, or the like. In the present embodiment, the storage unit 12 stores various types of information such as an integrated analysis program 81, a plurality of pieces of computation result data 221, principal component information 121, a group list 123, and assignment information 124.

The integrated analysis program 81 is a program for the integrated analysis apparatus 1 to execute later-described information processes (FIGS. 7, 9, and 10) relating to derivation of principal components 41. The integrated analysis program 81 includes series of commands of the information processes. The computation result data 221 indicates a result 51 of computation regarding a correlation between elements of local learning data 3 collected by a client apparatus 2. The principal component information 121 includes information regarding one or more derived principal components 41. The principal component information 121 is generated as a result of executing the integrated analysis program 81. The group list 123 shows a list of a plurality of groups that are candidates to which the client apparatuses 2 are assigned. The assignment information 124 indicates a correspondence relationship between the client apparatuses 2 and the groups.

The communication interface 13 is a wired LAN (local area network) module, a wireless LAN module, or the like, and is an interface for performing wired or wireless communication via a network. The integrated analysis apparatus 1 can perform data communication with another information processing apparatus via the network by using the communication interface 13.

The input apparatus 14 is an apparatus for performing input, such as a mouse or a keyboard. Also, the output apparatus 15 is an apparatus for performing output, such as a display, a speaker, or the like. An operator such as a user can operate the integrated analysis apparatus 1 by using the input apparatus 14 and the output apparatus 15.

The drive 16 is a CD drive, a DVD drive, or the like, and is a drive apparatus for reading various types of information such as a program stored in a storage medium 91. The storage medium 91 is a medium that stores information such as programs via an electrical, magnetic, optical, mechanical or chemical effect such that the stored information such as the programs can be read by an apparatus or a machine such as a computer. At least one of the integrated analysis program 81, the plurality of pieces of computation result data 221, the group list 123, and the assignment information 124 may be stored in the storage medium 91. The integrated analysis apparatus 1 may acquire at least one of the integrated analysis program 81, the plurality of pieces of computation result data 221, the group list 123, and the assignment information 124 from the storage medium 91. Note that, in FIG. 2, a disk-type storage medium such as a CD or a DVD is illustrated as an example of the storage medium 91. However, the type of the storage medium 91 is not limited to the disk type, and may be a medium other than a disk type medium. Storage media other than a disk type medium include a semiconductor memory such as a flash memory, for example. The type of the drive 16 may be selected as appropriate according to the type of the storage medium 91.

Note that, regarding the specific hardware configuration of the integrated analysis apparatus 1, constituent elements can be omitted, replaced, and added as appropriate according to the embodiment. For example, the control unit 11 may also include a plurality of hardware processors. The hardware processors may also be constituted by a microprocessor, an FPGA (field-programmable gate array), a DSP (digital signal processor), and the like. The storage unit 12 may be constituted by the RAM and ROM included in the control unit 11. At least one of the communication interface 13, the input apparatus 14, the output apparatus 15, and the drive 16 may be omitted. The integrated analysis apparatus 1 may also be constituted by a plurality of computers. In this case, the hardware configuration of the computers may be the same, or may not be the same. Also, the integrated analysis apparatus 1 may be a general-purpose computer apparatus such as a PC (personal computer) or a general-purpose server apparatus, instead of an information processing apparatus that is specifically designed for the service to be provided.

<Client Apparatus>

Figure 3:
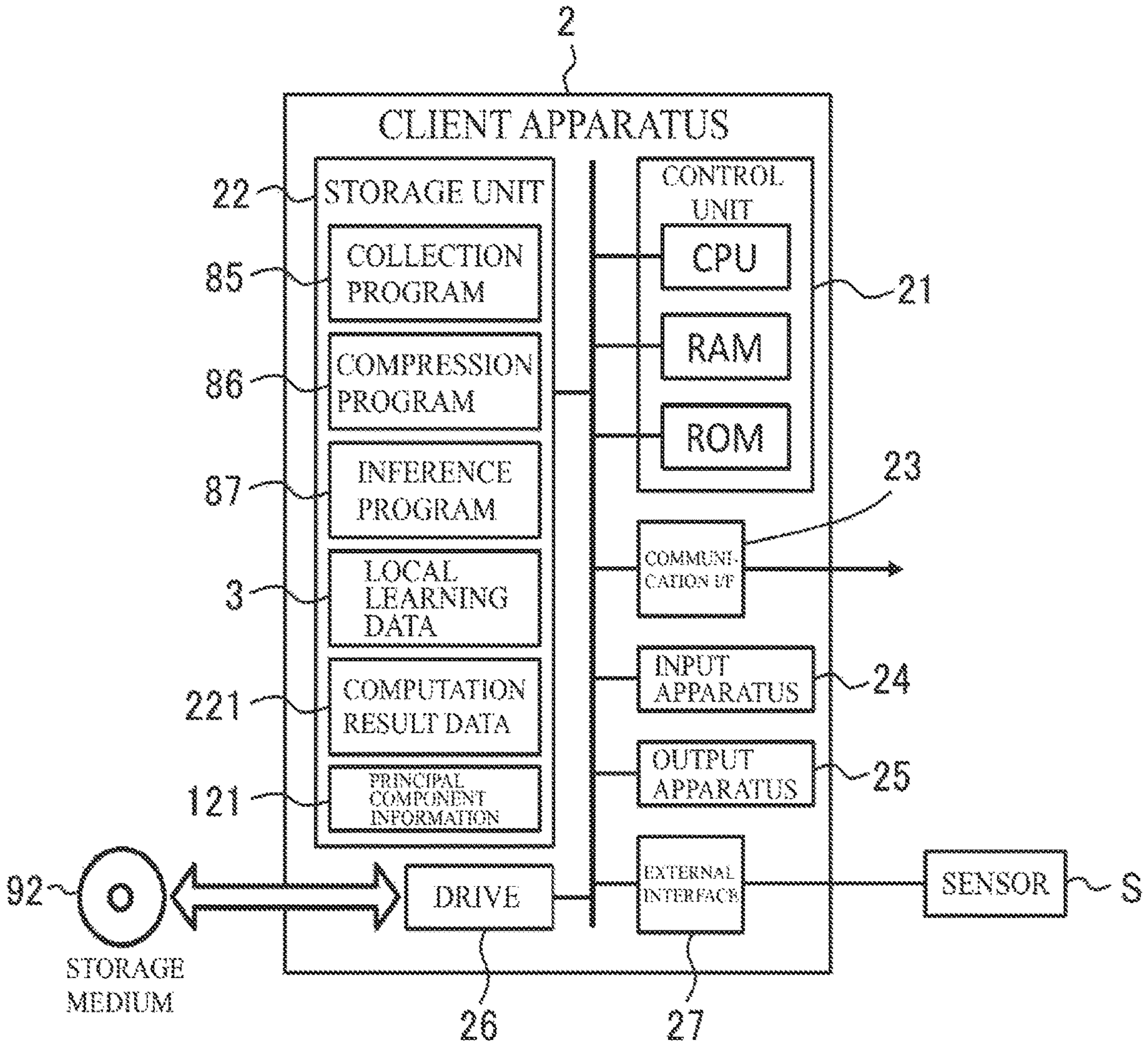
FIG. 3 is a schematic diagram illustrating an example of a hardware configuration of a client apparatus according to the embodiment one or more embodiments.

FIG. 3 schematically illustrates an example of a hardware configuration of each client apparatus 2 according to the present embodiment. As shown in FIG. 3, each client apparatus 2 according to the present embodiment is a computer in which a control unit 21, a storage unit 22, a communication interface 23, an input apparatus 24, an output apparatus 25, a drive 26, and an external interface 27 are electrically connected.

The units from the control unit 21 to the drive 26 of each client apparatus 2 and a storage medium 92 may be configured similarly to the units from the control unit 11 to the drive 16 of the integrated analysis apparatus 1 and the storage medium 91 that are described above. That is, the control unit 21 includes a CPU, which is a hardware processor, a RAM, a ROM, and the like, and is configured to execute various information processes based on a program and data. The storage unit 22 is constituted by a hard disk drive, a solid-state drive, or the like. The storage unit 22 stores various types of information such as a collection program 85, a compression program 86, an inference program 87, local learning data 3, computation result data 221, and principal component information 121.

Figure 6A:
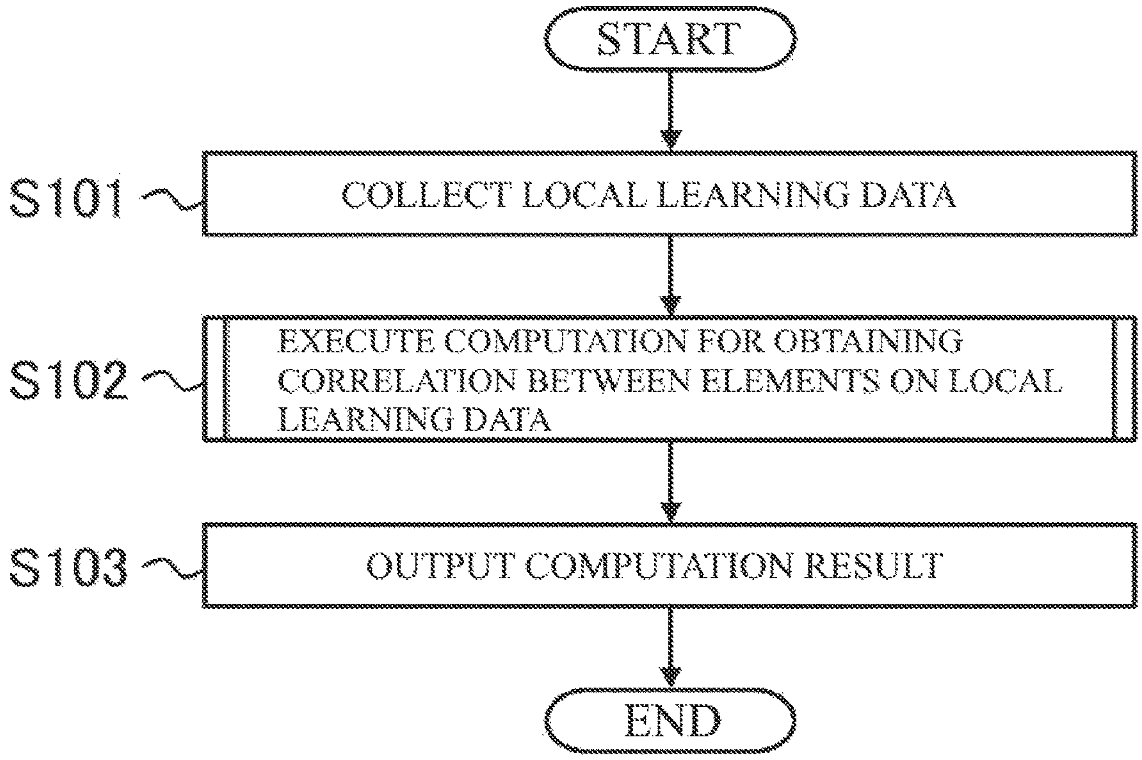
FIG. 6A illustrates an example of a procedure of collecting local learning data that is to be executed by a client apparatus according to one or more embodiments.
Figure 6B:
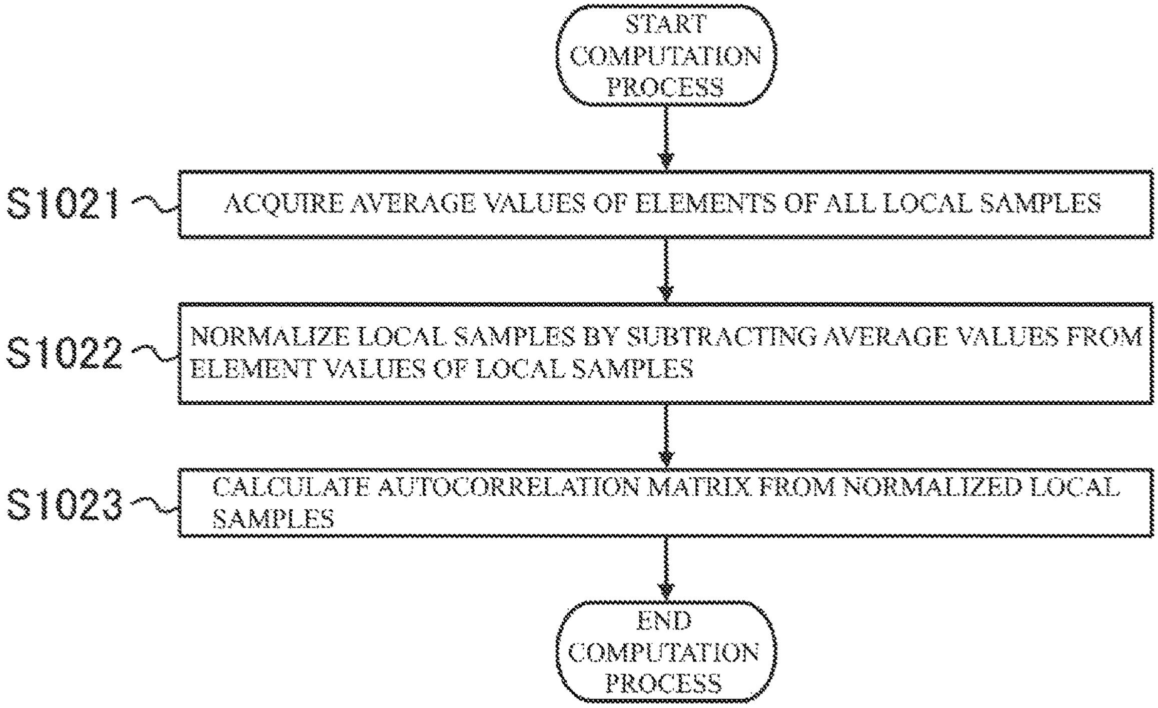
FIG. 6B is a diagram illustrating an example of a procedure of calculating correlation between elements of local learning data according to one or more embodiments.
Figure 11:
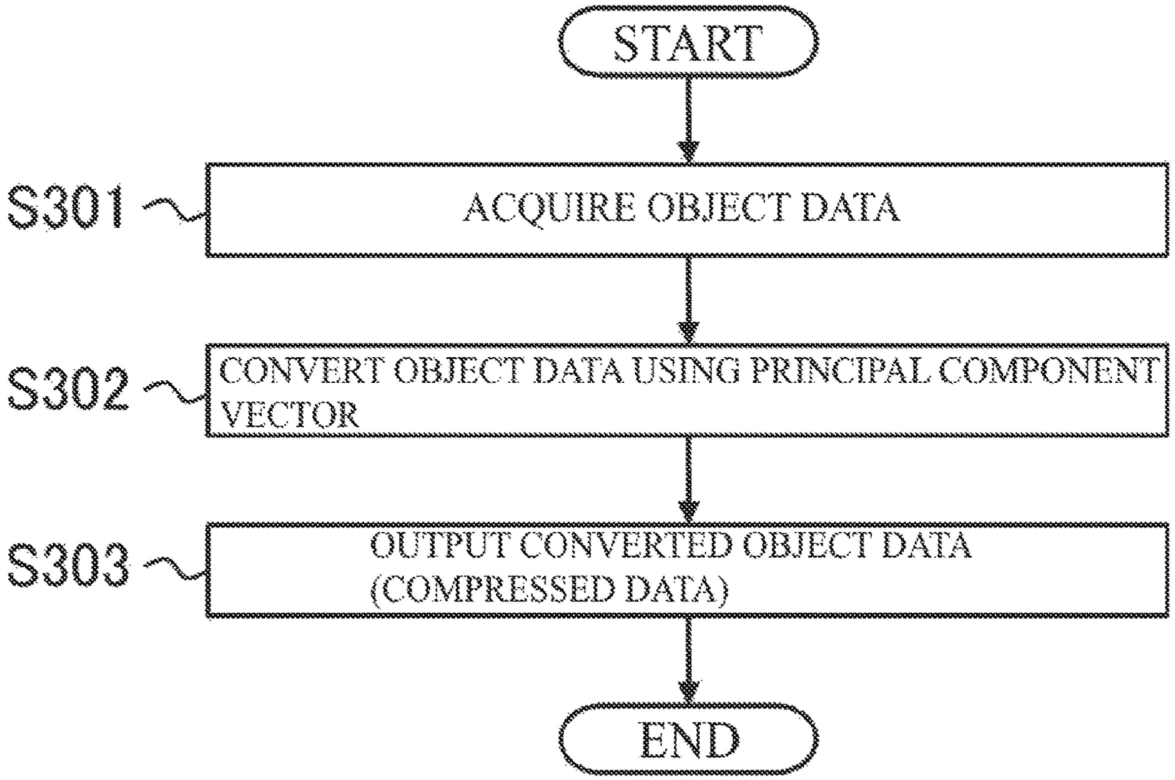
FIG. 11 is a diagram illustrating an example of a procedure of data compression to be executed by a client apparatus according to one or more embodiments.
Figure 12:
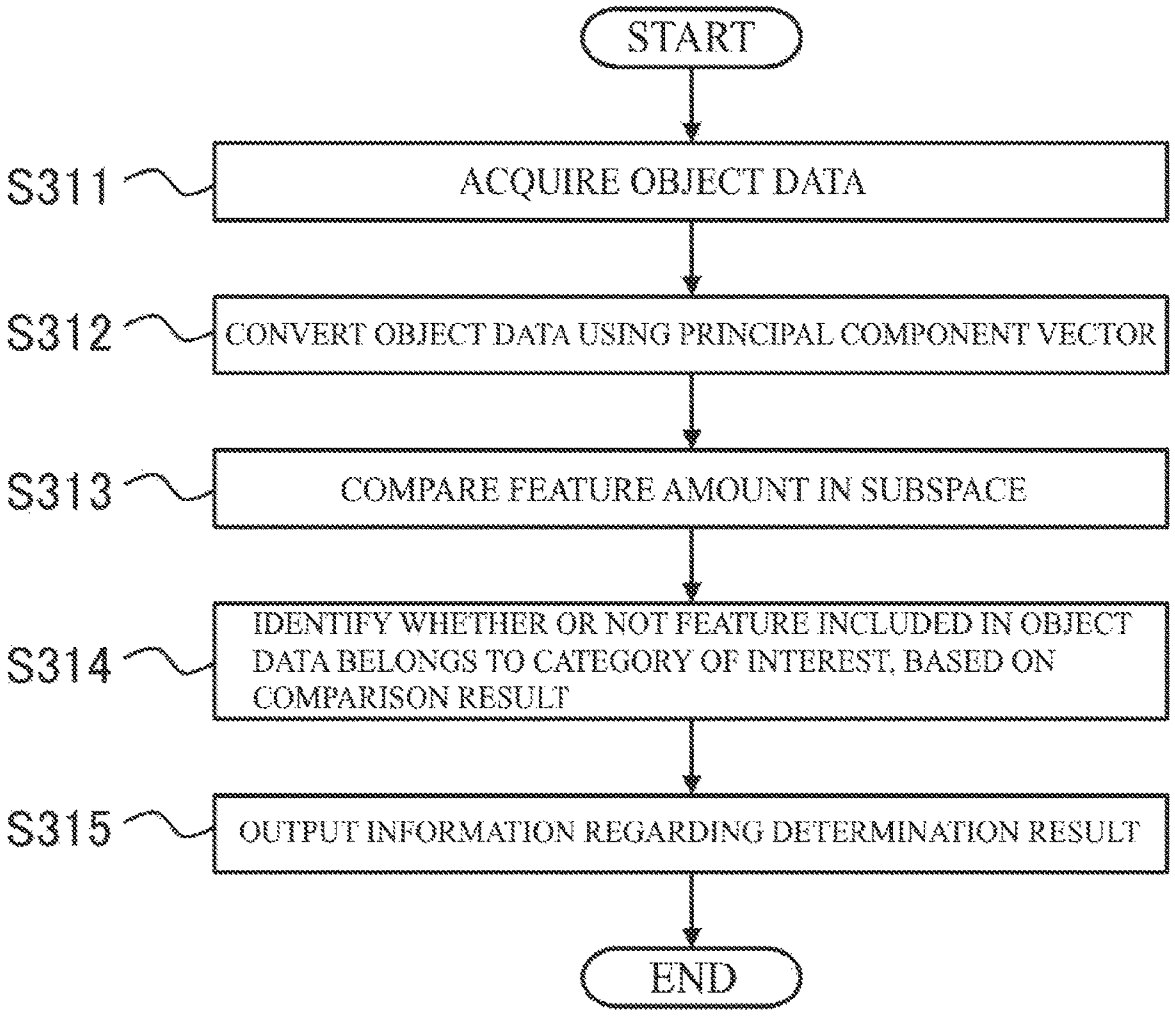
FIG. 12 is a diagram illustrating an example of a procedure of predetermined inference to be executed by a client apparatus according to one or more embodiments.

The collection program 85 is a program for each client apparatus 2 to collect local learning data 3 and execute a later-described information process relating to generating a result 51 of a computation regarding correlation (FIGS. 6A and 6B). The local learning data 3 and the computation result data 221 are generated as a result of executing the collection program 85. The compression program 86 is a program for each client apparatus 2 to execute a later-described information process relating to data compression using one or more derived principal components 41 (FIG. 11). The inference program 87 is a program for each client apparatus 2 to execute a later-described information process relating to predetermined inference using one or more derived principal components 41 (FIG. 12). The name of the inference program 87 may be changed as appropriate according to the contents of inference, such as "inspection program", "monitoring program", "diagnostic program", "detection program", or "estimation program". The programs 85 to 87 include series of commands of the information processes. At least one of the collection program 85, the compression program 86, the inference program 87, and the principal component information 121 may be stored in the storage medium 92. Also, each client apparatus 2 may acquire at least one of the collection program 85, the compression program 86, the inference program 87, and the principal component information 121 from the storage medium 92.

The external interface 27 is a USB (universal serial bus) port, a dedicated port, or the like, and is an interface for connecting to an external apparatus. The type and the number of external interfaces 27 may be selected as appropriate. Each client apparatus 2 may be connected to a sensor S for obtaining samples via at least one of the communication interface 23 and the external interface 27.

Note that, regarding the specific hardware configuration of the client apparatuses 2, constituent elements can also be omitted, replaced, and added as appropriate depending on the embodiment. For example, the control unit 21 may include a plurality of hardware processors. The hardware processors may be constituted by a microprocessor, an FPGA, a DSP, and the like. The storage unit 22 may be constituted by the RAM and ROM included in the control unit 21. At least one of the communication interface 23, the input apparatus 24, the output apparatus 25, the drive 26, and the external interface 27 may be omitted. Each client apparatus 2 may be constituted by a plurality of computers. In this case, the hardware configuration of the computers may be the same, or may not be the same. Each client apparatus 2 may be a general-purpose server apparatus, a general-purpose PC, a PLC (programmable logic controller), a tablet terminal, or the like, instead of an information processing apparatus that is specifically designed for the service to be provided.

[Software Configuration]

<Integrated Analysis Apparatus>

Figure 4:
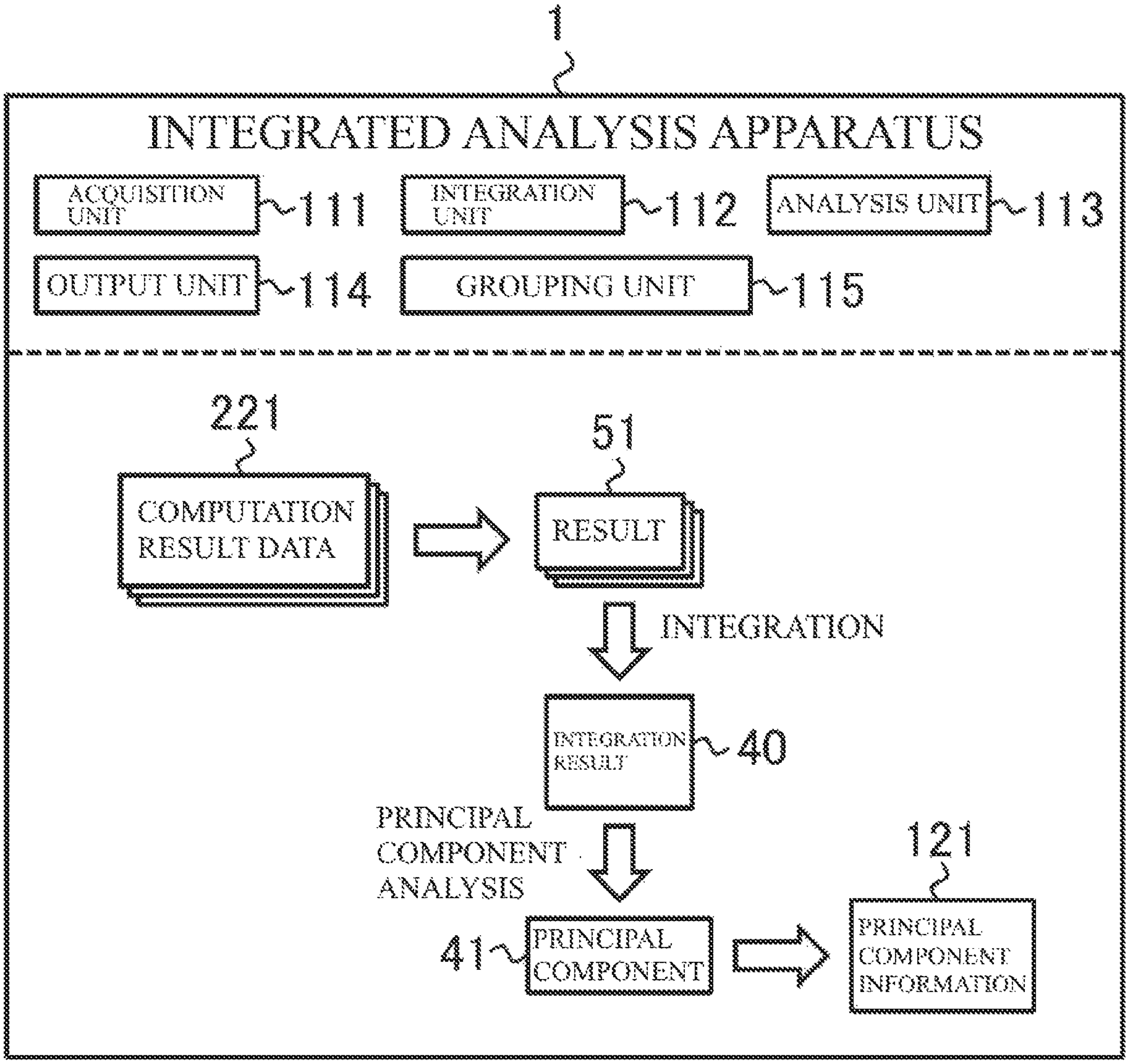
FIG. 4 is a schematic diagram illustrating an example of a software configuration of an integrated analysis apparatus according to one or more embodiments.

FIG. 4 schematically illustrates an example of a software configuration of the integrated analysis apparatus 1 according to the present embodiment.

The control unit 11 of the integrated analysis apparatus 1 deploys the integrated analysis program 81 stored in the storage unit 12 in the RAM. Then, the control unit 11 controls the constituent elements by the CPU interpreting and executing instructions included in the integrated analysis program 81 deployed in the RAM. With this, as shown in FIG. 4, the integrated analysis apparatus 1 according to the present embodiment operates as a computer including an acquisition unit 111, an integration unit 112, an analysis unit 113, an output unit 114, and a grouping unit 115, as software modules. That is, in the present embodiment, the software modules of the integrated analysis apparatus 1 are realized by the control unit 11 (CPU).

The acquisition unit 111 acquires computation result data 221 indicating results 51 of computation for obtaining a correlation between elements of local samples included in local learning data 3, the computation being executed on the local learning data 3 collected by the client apparatuses 2. The integration unit 112 calculates an integration result 40 indicating the correlation between elements of all of the local samples included in all of the local learning data by integrating the results 51 of computation acquired from the client apparatuses 2. The analysis unit 113 derives one or more principal components 41 from the calculated integration result 40 by executing principal component analysis. The output unit 114 outputs principal component information 121 regarding the one or more derived principal components 41. The grouping unit 115 assigns each client apparatus 2 to at least one of the plurality of groups.

<Client Apparatus>

Figure 5A:
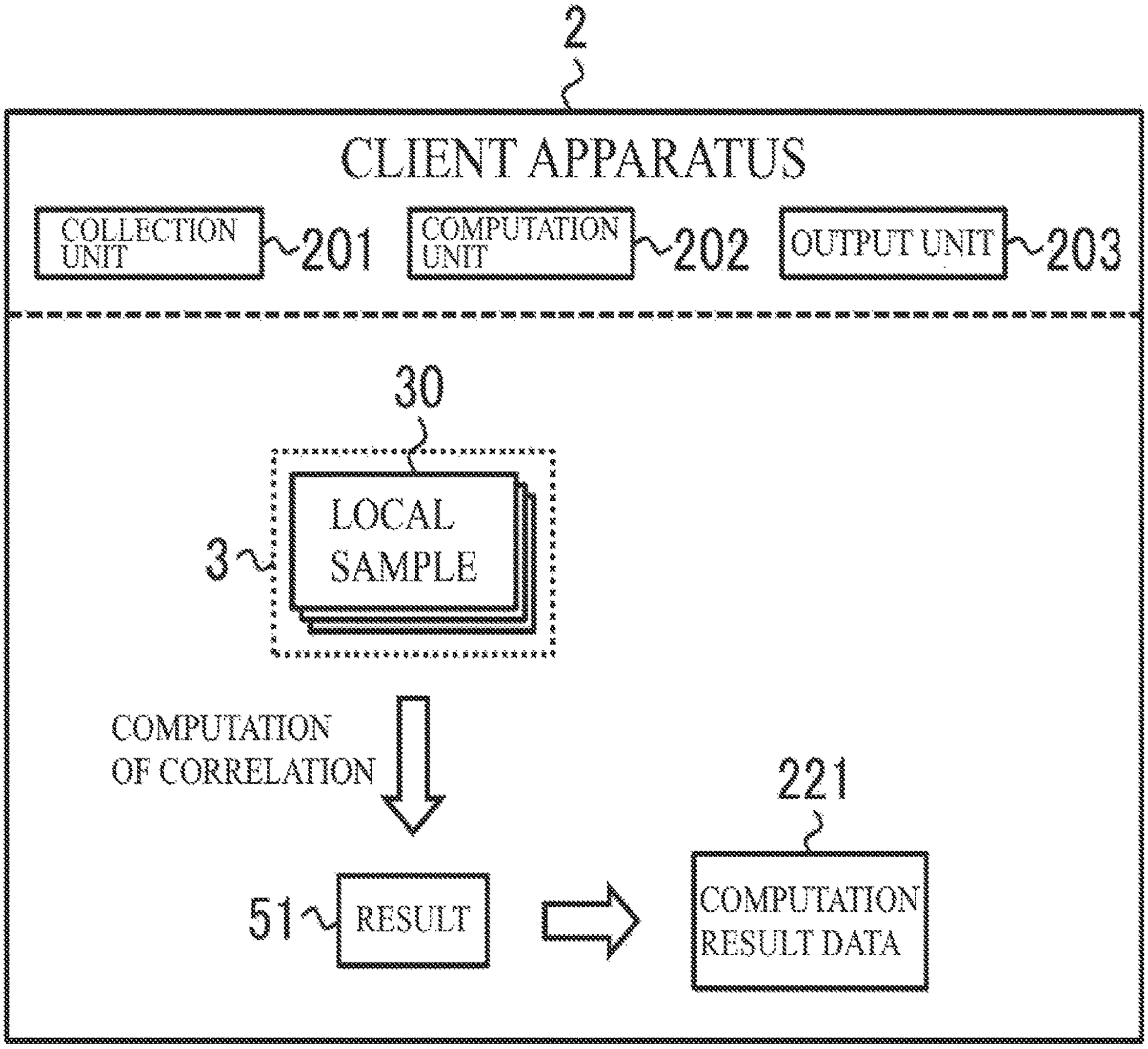
FIG. 5A is a schematic diagram illustrating an example of a software configuration of a client apparatus according to one or more embodiments.
Figure 5B:
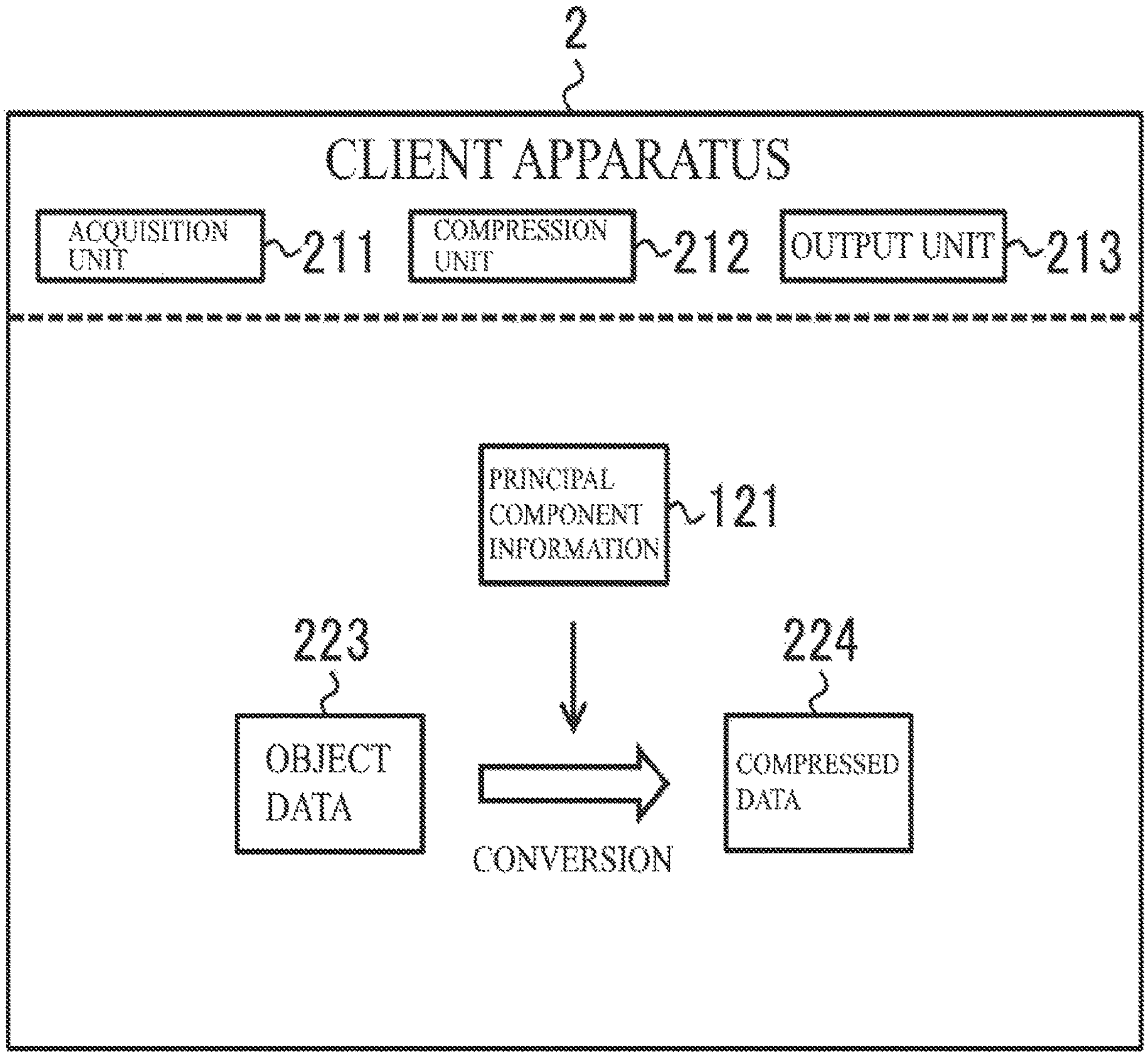
FIG. 5B is a schematic diagram illustrating an example of a software configuration of a client apparatus according to one or more embodiments.
Figure 5C:
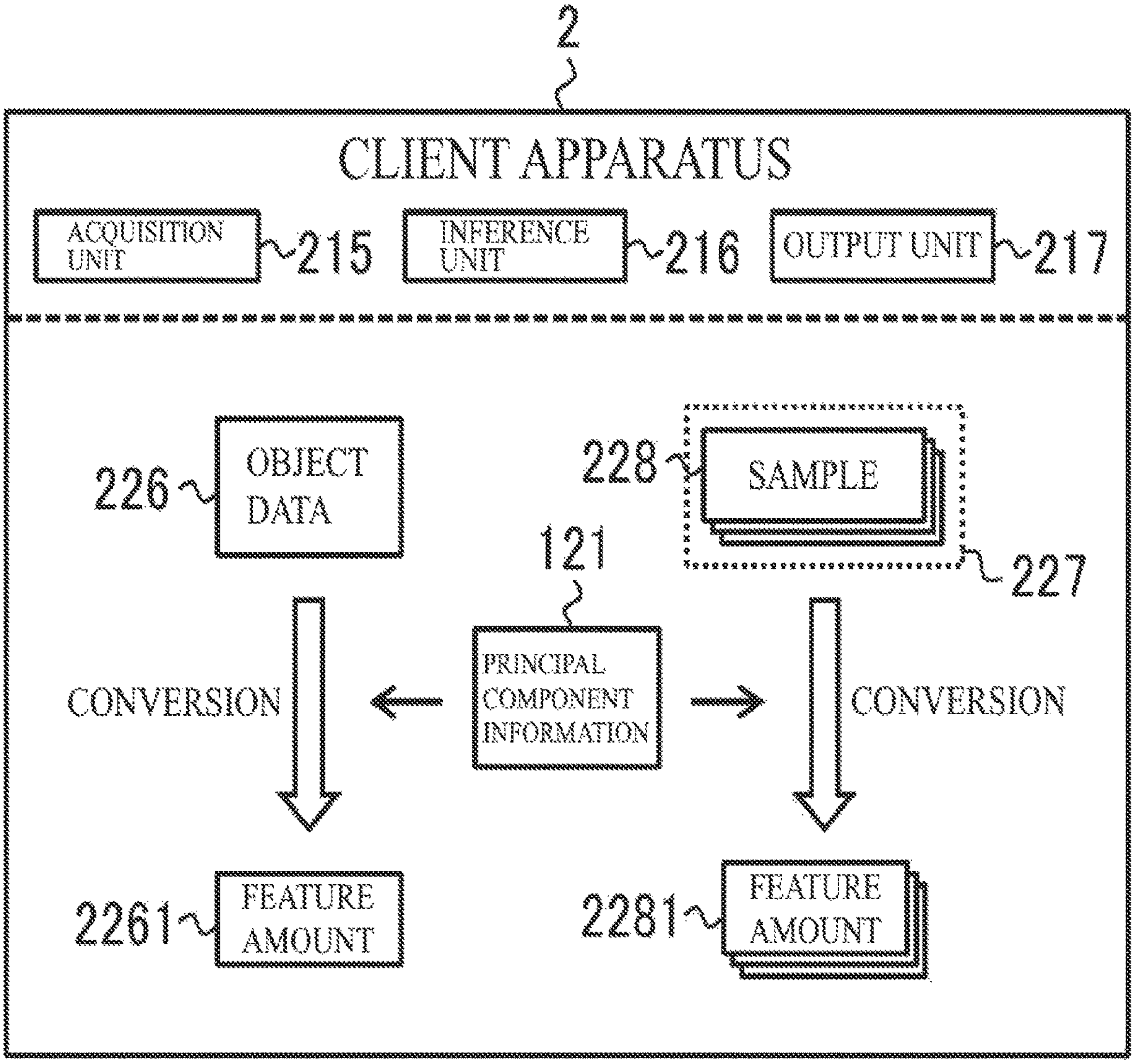
FIG. 5C is a schematic diagram illustrating an example of a software configuration of a client apparatus according to one or more embodiments.

FIGS. 5A to 5C schematically illustrate an example of a software configuration of the client apparatuses 2 depending on the embodiment.

Similarly to the integrated analysis apparatus 1 described above, the control unit 21 of each client apparatus 2 interprets and executes commands included in the collection program 85 by the CPU. With this, as shown in FIG. 5A, each client apparatus 2 according to the present embodiment operates as a computer including a collection unit 201, a computation unit 202, and an output unit 203 as software modules. Similarly, the control unit 21 interprets and executes commands included in the compression program 86 by its CPU. With this, as shown in FIG. 5B, each client apparatus 2 according to the present embodiment operates as a computer including an acquisition unit 211, a compression unit 212, and an output unit 213 as software modules. The control unit 21 interprets and executes commands included in the inference program 87 by its CPU. With this, as shown in FIG. 5C, each client apparatus 2 according to the present embodiment operates as a computer including an acquisition unit 215, an inference unit 216, and an output unit 217 as software modules. That is, in the present embodiment, the software modules in the information processes of each client apparatus 2 are realized by their respective control unit 21 (CPU), similarly to the integrated analysis apparatus 1 described above.

As shown in FIG. 5A, the collection unit 201 collects local learning data 3 constituted by a plurality of local samples 30. The computation unit 202 executes, with respect to the local learning data 3, computation for obtaining a correlation between elements of the local samples 30 included in the local learning data 3. The output unit 203 outputs computation result data 221 indicating the computation result 51 generated by the computation unit 202.

As shown in FIG. 5B, the acquisition unit 211 acquires object data 223 (sample) whose information amount is to be reduced (that is, compressed). The compression unit 212 compresses the object data 223 by referring to the principal component information 121 and using the derived principal components 41. With this, the compression unit 212 generates compressed data 224. The output unit 213 outputs the generated compressed data 224.

As shown in FIG. 5C, the acquisition unit 215 acquires object data 226 (sample) regarding which inference is performed. The inference unit 216 performs predetermined inference on the object data 226 by referring to the principal component information 121 and using the derived principal components 41. The inference method may be selected as appropriate. In the present embodiment, the inference unit 216 executes class identification on features included in object data 226 based on the comparison between the object data 226 and a data group 227, as an example of the inference. Specifically, the data group 227 is constituted by a plurality of samples 228. A local sample 30 constituting the local learning data 3 may be used as at least one of the plurality of samples 228. The samples 228 include features of corresponding categories. The samples 228 are converted to feature amounts 2281 by being projected on a subspace using the principal components 41. With this, the range belonging to the category of interest in the subspace can be determined. The inference unit 216 converts object data 226 to a feature amount 2261 by projecting on the subspace using the principal components 41. The inference unit 216 compares the obtained feature amount 2261 with the feature amounts 2281 inside the subspace. The inference unit 216 determines whether or not the feature included in the object data 226 belongs to the category of interest based on the comparison result. The output unit 217 outputs information regarding the inference result.

<Other Considerations>

The integrated analysis apparatus 1 and the software modules of the client apparatuses 2 will be described in detail in a later-described exemplary operation. Note that, in the present embodiment, an example is described in which the software modules of the integrated analysis apparatus 1 and the client apparatuses 2 are realized by a general-purpose CPU. However, some of or all of the software modules described above may be realized by at least one dedicated processor. Also, regarding the software configuration of the integrated analysis apparatus 1 and the client apparatuses 2, software modules may also be omitted, replaced, and added as appropriate depending on the embodiment.

3. Exemplary Operation (1) Data Collection

FIG. 6A is a flowchart illustrating an example of a procedure of collecting local learning data 3 by the client apparatuses 2 according to the present embodiment. Note that the procedures to be described in the following are merely examples, and each step may be modified to the extent possible. Moreover, in the procedure described below, steps may also be omitted, replaced, or added as appropriate depending on the embodiment.

(Step S101)

In step S101, the control unit 21 operates as the collection unit 201, and collects local learning data 3.

The local learning data 3 is constituted by a plurality of local samples 30. The local samples 30 may be acquired as appropriate. For example, in a real space or a virtual space, data is generated under various conditions. The generated data can be acquired as a local sample 30. In the present embodiment, sensing data may be generated by observing an object under various conditions using a sensor S. The object to be observed may be selected as appropriate according to the purpose of use of the local samples 30. The generated sensing data can be acquired as a local sample 30.

The local samples 30 may be automatically generated by the operation of a computer, or may also be manually generated, in which an operator operation is at least partially included. Also, the local samples 30 may be generated by the client apparatuses 2, or may also be generated by a computer other than the client apparatuses 2. When the local samples 30 are generated by the client apparatuses 2, the control units 21 may acquire the local samples 30 automatically, or by operators manually executing the generation process described above by manipulating the input apparatuses 24. On the other hand, when the local samples 30 are generated by another computer, the control units 21 can acquire the local samples 30 generated by the other computer via a network, a storage medium 92, or the like. A configuration may also be adopted in which some local samples 30 are generated by the client apparatuses 2, and the other local samples 30 are generated by one or more other computers.

The number of local samples 30 may be selected as appropriate. Upon collecting the local learning data 3, the control unit 21 advances the processing to the next step S102.

(Step S102)

In step S102, the control unit 21 operates as the computation unit 202, and executes, with respect to the local learning data 3, computation for obtaining the correlation between elements of the local samples 30 included in the local learning data 3. With this, the control unit 21 generates a result 51 of computation regarding the correlation between the elements of the local learning data 3. The computation details may be determined as appropriate according to the format of the result 51.

FIG. 6B is a flowchart illustrating a procedure of a subroutine regarding calculation of correlation between elements of local learning data 3 according to the present embodiment. The process in step S102 according to the present embodiment includes the processes in the following steps S1021 to S1023. Note that the procedure described below is merely an example, and each process may be changed to the extent possible. Furthermore, in the procedure described below, steps may also be omitted, replaced, or added as appropriate depending on the embodiment.

(Step S1021)

In step S1021, the control unit 21 acquires average values of the respective elements, regarding all of the local samples.

The method of calculating the average values of the respective elements of all of the local samples may be determined as appropriate. As an example, the local learning data 3 of the client apparatuses 2 can be expressed by the following Formula 1. The local samples 30 included in local learning data 3 can be expressed by the following Formula 2. The average values of the respective elements of all of the local samples can be calculated from the number of local samples 30 included in the local learning data 3 and the average values of the respective elements.

[Math. 1]

$$X^{(P)} = \left[\left(X_1^{(P)}\right)^T \ \dots \ \left(X_{N^{(P)}}^{(P)}\right)^T\right]^T \quad \text{Formula 1}$$

[Math. 2]

$$X_n^{(P)} = \left[x_{n\_1}^{(P)} \ \dots \ x_{n\_d}^{(P)}\right] \quad \text{Formula 2}$$

$X^{(P)}$ indicates the local learning data 3 collected by a $P^{th}$ client apparatus 2. $N^{(P)}$ indicates the number of local samples 30. $X_n^{(P)}$ indicates the $n^{th}$ local sample 30. d indicates the number of elements (number of dimensions). $X_n^{(P)}$ indicates the $i^{th}$ element in the $n^{th}$ local sample 30. The control unit 21 calculates the average values of the respective elements regarding the local samples 30 included in the local learning data 3 by executing computation of the following Formula 3.

[Math. 3]

$$U^{(P)} = \left[u_1^{(P)} \ \dots \ u_d^{(P)}\right] = \left[\frac{1}{N^{(P)}}\sum_{n=1}^{N^{(P)}} x_{n\_1}^{(P)} \ \dots \ \frac{1}{N^{(P)}}\sum_{n=1}^{N^{(P)}} x_{n\_d}^{(P)}\right] \quad \text{Formula 3}$$

$U^{(P)}$ indicates the average values of the respective elements regarding the local samples 30 included in the local learning data 3 collected by the $P^{th}$ client apparatus 2. $u_i^{(P)}$ indicates the average value of the $i^{th}$ element. In the following, the average values of the respective elements regarding local samples 30 may also be described as "averages of local samples".

Each client apparatus 2 notifies the other client apparatuses 2 of the averages and the number of the own local samples. The notification method may be selected as appropriate. For example, the control unit 21 may notify the other client apparatuses 2 of the averages and number of the own local samples via a network using the communication interface 23. Also, the control unit 21 executes the computation of the following Formula 4 using the number and averages of the own local samples and the numbers and averages of the local samples acquired from the other client apparatuses 2.

[Math. 4]

$$U = [u_1 \ \dots \ u_d] = \frac{\sum_P N^{(P)} U^{(P)}}{\sum_P N^{(P)}} \quad \text{Formula 4}$$

U indicates the average values of the respective elements of all of the local samples. $u_i$ indicates the average value of the $i^{th}$ element regarding all of the local samples. Accordingly, the control unit 21 of each client apparatus 2 can acquire the average value U of the elements of all of the local samples. Upon acquiring the average value U, the control unit 21 advances the processing to the next step S1022.

Note that the computation process of the average value U is not limited to this example. As an example, the computation in Formula 4 may be executed by another computer. The other computer may also be the integrated analysis apparatus 1. In this case, the control unit 21 of each client apparatus 2 notifies the other computer of the averages and the number of the own local samples. The other computer calculates the average value U of the elements of all of the local samples by executing the computation of Formula 4 using the averages and the number of the local samples that are acquired from the client apparatuses 2. The other computer notifies the client apparatuses 2 of the calculated average value U. With this, the control unit 21 of each client apparatus 2 can acquire the average value U of the elements of all of the local samples.

(Step S1022)

In step S1022, the control unit 21 subtracts the acquired average values from the values of elements of the local samples 30 included in the local learning data 3, as shown in the following Formula 5. With this, the control unit 21 normalizes (centralizes) the local samples 30.

[Math. 5]

$$X_C^{(P)} = \left[\left(X_1^{(P)} - U\right)^T \ \dots \ \left(X_{N^{(P)}}^{(P)} - U\right)^T\right]^T \quad \text{Formula 5}$$

$X_C^{(P)}$ indicates the local learning data 3 that is collected and normalized by a $P^{th}$ client apparatus 2. Upon normalizing the local samples 30, the control unit 21 advances the processing to the next step S1023.

(Step S1023)

In step S1023, the control unit 21 executes the computation of the following Formula 6. With this, the control unit 21 calculates an autocorrelation matrix of local learning data 3 from the normalized local samples 30.

[Math. 6]

$$Q^{(P)} = \left(X_C^{(P)}\right)^T X_C^{(P)} \quad \text{Formula 6}$$

$Q^{(P)}$ indicates an autocorrelation matrix calculated in a $P^{th}$ client apparatus 2. With this, the control unit 21 can acquire an autocorrelation matrix as the result 51 of computation regarding a correlation between elements of local learning data 3. Upon calculating the autocorrelation matrix, the control unit 21 ends the subroutine regarding the calculation of correlation according to the present embodiment, and advances the processing to the next step S103.

(Step S103)

In step S103, the control unit 21 operates as the output unit 203, and outputs computation result data 221 indicating the generated computation result 51.

The output format may be determined as appropriate according to the embodiment. For example, the control unit 21 may output the computation result data 221 to the output apparatus 25 as the process in step S103. Also, the control unit 21 may save the computation result data 221 in a predetermined storage area, as the process in step S103. The predetermined storage area may be the RAM in the control unit 21, the storage unit 22, an external storage apparatus, or a storage medium, or a combination of these, for example. The storage media may be a CD, a DVD, or the like, and the control unit 21 may store the computation result data 221 in the storage media via the drive 26. The external storage apparatus may be a data server such as a NAS (network attached storage). In this case, the control unit 21 may also store the computation result data 221 in the data server via a network using the communication interface 23. Moreover, the external storage apparatus may also be an external storage apparatus connected to the client apparatuses 2 via the external interface 27, for example.

Upon completing outputting the computation result data 221, the control unit 21 ends the series of processes regarding collection of the local learning data 3.

(2) Principal Component Analysis

Figure 7:
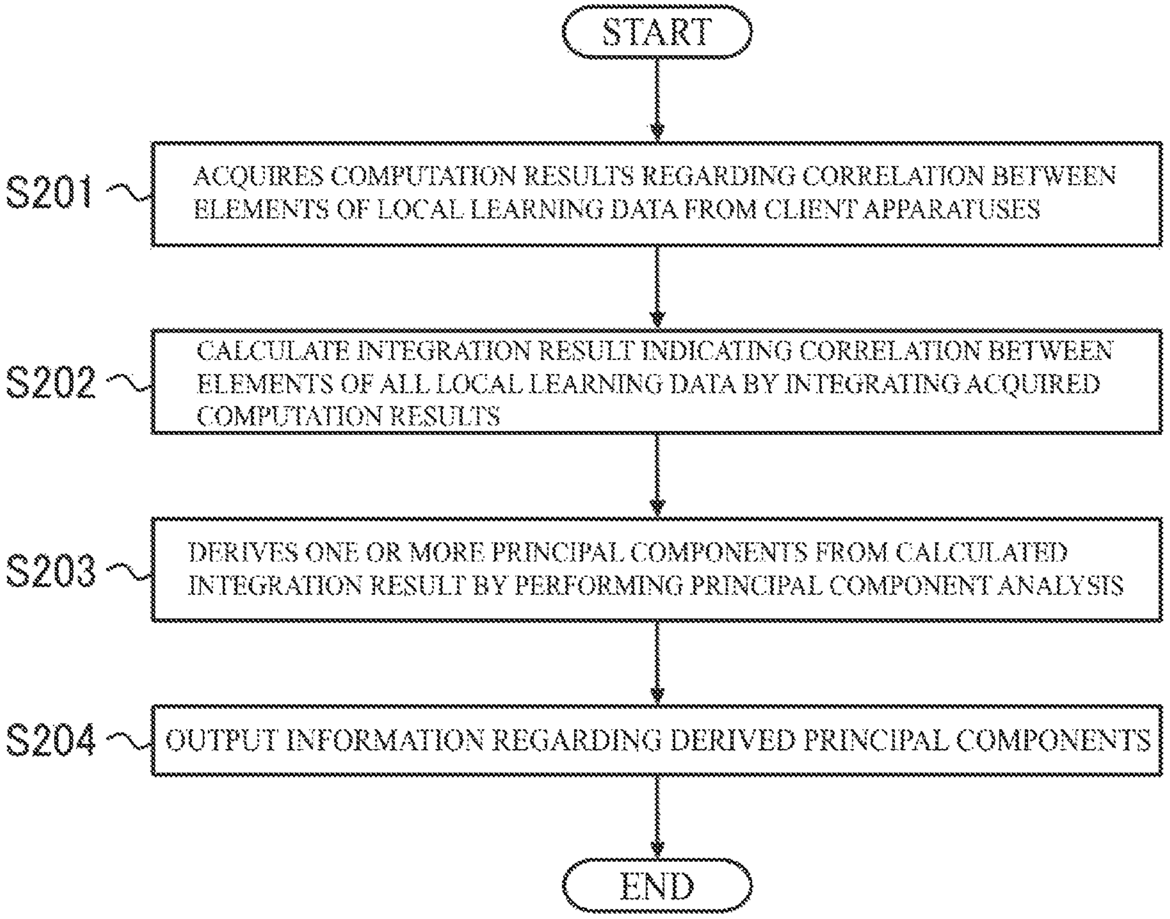
FIG. 7 is a diagram illustrating an example of a procedure of an integrated analysis apparatus according to one or more embodiments.

FIG. 7 illustrates an example of a procedure of the integrated analysis apparatus 1 according to the present embodiment. The procedure described below is an example of the integrated analysis method. The integrated analysis method may include the procedure of data collection described above. Note that the procedure described below is merely an example, and each step may be changed to the extent possible. Moreover, in the procedure described below, steps may also be omitted, replaced, or added as appropriate depending on the embodiment.

(Step S201)

In step S201, the control unit 11 operates as the acquisition unit 111, and acquires computation result data 221 indicating a computation result 51 in each client apparatus 2.

The computation result data 221 of the client apparatuses 2 may be provided to the integrated analysis apparatus 1 at any time. For example, the client apparatuses 2 may transfer the computation result data 221 to the integrated analysis apparatus 1 as the process in step S103, or in a process different from the process in step S103. The control unit 11 may acquire computation result data 221 of the client apparatuses 2 by receiving this transfer. Also, the control unit 11 may acquire computation result data 221 by accessing the client apparatuses 2 or a data server via a network using the communication interface 13, for example. Also, the control unit 11 may acquire computation result data 221 via a storage medium 91 or an external storage apparatus, for example. Also, the control unit 11 may acquire computation result data 221 by an operator inputting computation results 51 output to the output apparatuses 25 of the client apparatuses 2 through the input apparatus 14, for example. In the present embodiment, the control unit 11 acquires computation result data 221 indicating the autocorrelation matrix of local learning data 3 as the computation result 51. Upon completing acquisition of computation result data 221, the control unit 11 advances the processing to the next step S202.

(Step S202)

In step S202, the control unit 11 operates as the integration unit 112, and calculates an integration result 40 indicating the correlation between the elements of all of the local samples included in all of the local learning data by integrating the computation results 51 indicated by the computation result data 221 acquired from the client apparatuses 2.

The computation details of integration may be determined as appropriate according to the format of results 51 of computation. In the present embodiment, the computation result 51 is expressed by the aforementioned autocorrelation matrix. Therefore, the control unit 11 may calculate the sum of the autocorrelation matrices obtained from the client apparatuses 2. Also, the control unit 11 may acquire, as appropriate, information indicating the numbers of local samples 30 in the client apparatuses 2. Then, the control unit 11 may divide the sum of the autocorrelation matrices by the sum of the numbers of the local samples 30. With this, the control unit 11 can calculate the variance-covariance matrix C, as shown in the following Formula 7. The control unit 11 may acquire the calculated variance-covariance matrix C as the integration result 40. Upon calculating the integration result 40, the control unit 11 advances the processing to the next step S203.

[Math. 7]

$$C = \frac{\sum_P Q^{(P)}}{\sum_P N^{(P)} - 1} \quad \text{Formula 7}$$

Note that the format of the integration result 40 is not limited to this example. The integration result 40 may be expressed by a correlation coefficient matrix, as an example of another format. In this case, the control unit 11 may calculate the correlation coefficient matrix of all of the local samples from the autocorrelation matrices of local learning data 3 of the client apparatuses 2. The control unit 11 may acquire the calculated correlation coefficient matrix as the integration result 40.

(Step S203)

In step S203, the control unit 11 operates as the analysis unit 113, and derives one or more principal components 41 from the calculated integration result 40 by executing principal component analysis.

The computation details of the principal component analysis may be determined as appropriate according to the embodiment. In the present embodiment, the control unit 11 can acquire a variance-covariance matrix C of all of the local samples as the integration result 40. Therefore, the control unit 11 may derive the one or more principal components 41 by performing KL expansion on the variance-covariance matrix C. Alternatively, the control unit 11 executes eigenvalue decomposition on the variance-covariance matrix, as shown in the following Formula 8. The control unit 11 may acquire eigenvalues A obtained by the eigenvalue decomposition as the principal components 41.

[Math. 8]

$$C = V \Lambda V^T \quad \text{Formula 8}$$

[Math. 9]

$$\Lambda=\mathrm{diag}(\lambda_1, \ldots, \lambda_r) \quad \text{Formula 9}$$

[Math. 10]

$$V=(v_1, \ldots, v_r) \quad \text{Formula 10}$$

V indicates an eigenvector (in the following, may also referred to as a "principal component vector"). Λ indicates an eigenvalue matrix. The eigenvector V can be expressed by Formula 9 above. Also, the eigenvalue matrix A can be expressed by Formula 10 above. diag in Formula 9 indicates a diagonal matrix. r indicates the number of eigenvalues (principal components 41). The components v of the eigenvector V can be calculated in the process of eigenvalue decomposition.

The number of principal components 41 to be derived may be selected as appropriate. For example, the control unit 11 may calculate a cumulative contribution ratio, and derive the principal components 41 until the calculated cumulative contribution ratio exceeds a threshold value. The threshold value may be determined as appropriate. With this, the control unit 11 can derive one or more principal components 41. Upon deriving one or more principal components 41, the control unit 11 advances the processing to the next step S204.

Note that the method of deriving the principal components 41 is not limited to the method described above. When the correlation coefficient matrix of all of the local samples is obtained as the integration result 40, the control unit 11 may also execute eigenvalue decomposition on the correlation coefficient matrix, as an example of another method. The control unit 11 may acquire eigenvalues obtained by the eigenvalue decomposition as principal components 41. Alternatively, the control unit 11 calculates a deviation matrix of the variance-covariance matrix or the correlation coefficient matrix, and executes singular value decomposition on the calculated deviation matrix. The control unit 11 may calculate principal components 41 from singular values obtained by the singular value decomposition. A known method may be adopted as appropriate to derive the principal components 41.

(Step S204)

In step S204, the control unit 11 operates as the output unit 114, and outputs principal component information 121 regarding the one or more derived principal components 41.

As long as a computer can use the derived principal components 41 or principal component vector by referring to the principal component information 121, the format of the principal component information 121 is not limited in particular, and may be determined as appropriate according to the embodiment. For example, the principal component information 121 may be constituted by at least one of the derived principal components 41 themselves or the aforementioned principal component vector.

Also, the output format of the principal component information 121 may be determined as appropriate according to the embodiment. For example, the control unit 11 may output the principal component information 121 to the output apparatus 15, as the process in step S204. Also, the control unit 11 may save the principal component information 121 in a predetermined storage area, as the process in step S204. The predetermined storage area may be the RAM in the control unit 11, the storage unit 12, an external storage apparatus, or a storage medium, or a combination of these, for example.

Also, the control unit 11 may distribute (transfer) the principal component information 121 to the client apparatuses 2, as the process in step S204, for example. The method of distribution may be selected as appropriate. The control unit 11 may directly distribute the principal component information 121 to the client apparatuses 2 via a network, as an example. Alternatively, the control unit 11 may indirectly distribute the principal component information 121 to the client apparatuses 2 via another computer such as a data server. The client apparatuses 2 can acquire the principal component information 121 by receiving this distribution.

Note that the providing method and providing timing are not limited to this example. The principal component information 121 may also be provided to the client apparatuses 2 via a storage medium 92 or an external storage apparatus, as another example. Alternatively, the principal component information 121 may also be provided to the client apparatuses 2 by operators inputting the principal component information 121 output to the output apparatus 15 of the integrated analysis apparatus 1 through the input apparatus 24. The control unit 11 may also provide the principal component information 121 to the client apparatuses 2 separately from the process in step S204. Also, the control unit 11 may provide the principal component information 121 to another computer, other than the client apparatuses 2, that uses the derived principal components 41.

Upon completing outputting of the principal component information 121, the control unit 11 ends the series of processes regarding the principal component analysis.

(3) Grouping

Figure 8:
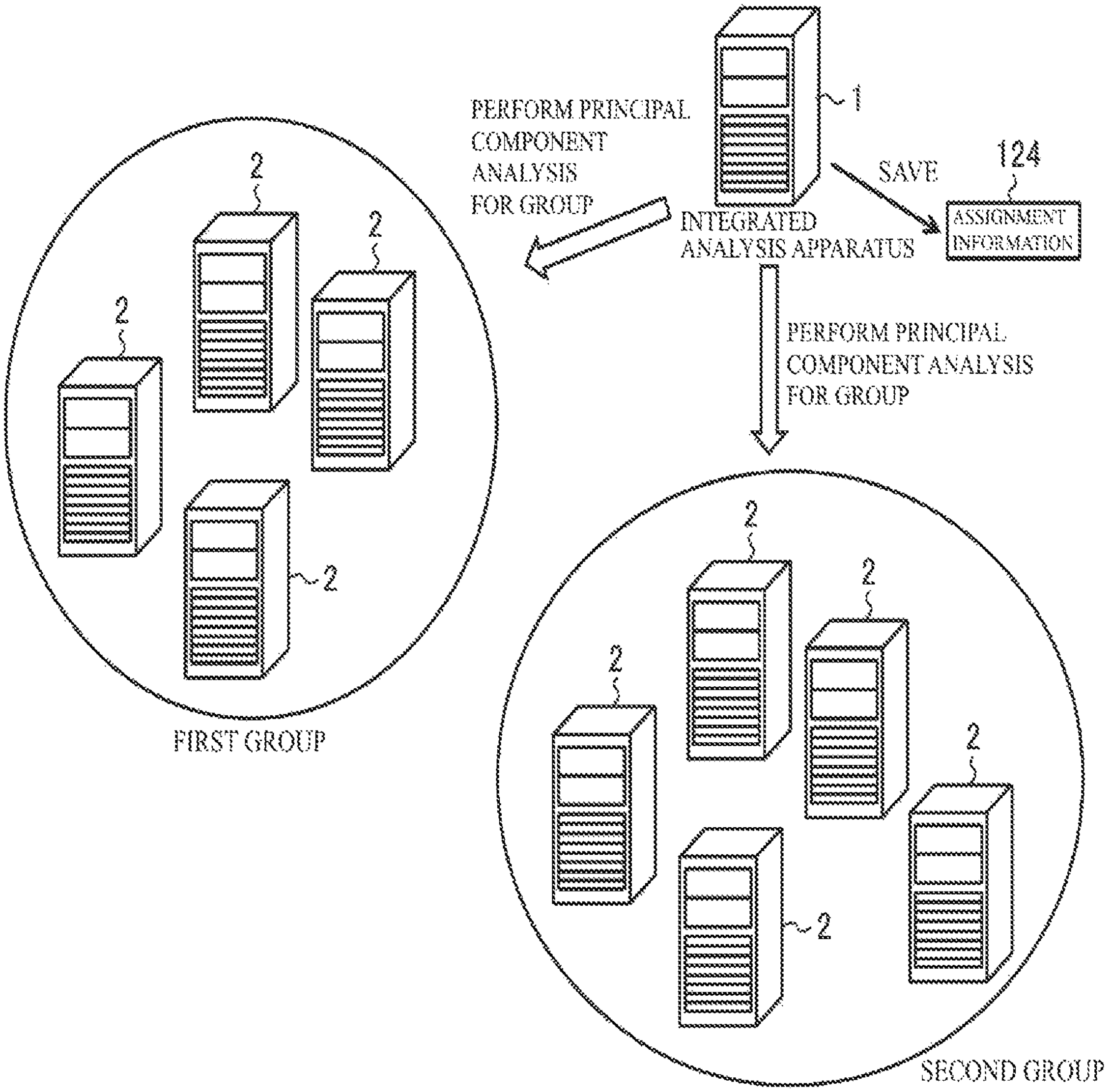
FIG. 8 is a schematic diagram illustrating an example of a grouping process according to one or more embodiments.

FIG. 8 schematically illustrates an example of a scenario of grouping the client apparatuses 2 according to the present embodiment. For example, when the data type is totally different between one local learning data 3 and another local learning data 3, it is difficult for the integrated analysis apparatus 1 to integrate the computation results 51 obtained from these pieces of data. Therefore, the control unit 11 operates as the grouping unit 116, and may assign each client apparatus 2 to at least one of a plurality of groups.

The groups may be set as appropriate according to the type, use purpose, or the like of the local learning data 3 (local sample 30). In the example in FIG. 8, the client apparatuses 2 are grouped into two groups, namely a first group and a second group. Note that the number of groups is not limited to two, and may be determined as appropriate. The control unit 11 stores the grouping result of the client apparatuses 2 in assignment information 124. The assignment information 124 may be saved in a predetermined storage area, for example. The predetermined storage area may be the RAM in the control unit 11, the storage unit 12, an external storage apparatus, or a storage medium, or a combination of these, for example.

In correspondence therewith, the control unit 11 executes the processes in steps S201 to S204 described above for each group. In the aforementioned step S202, the control unit 11 calculates an integration result 40 by integrating the computation results 51 acquired from the client apparatuses 2 in the same group. In the aforementioned step S203, the control unit 11 derives one or more principal components 41 from the integration result 40 calculated in the same group by performing principal component analysis. With this, the principal component analysis can be performed for each group.

The grouping method is not limited in particular, and may be determined as appropriate according to the embodiment. In the present embodiment, the control unit 11 can assign each client apparatus 2 to at least one of a plurality of groups using one of the following two methods. Note that the grouping of the client apparatuses 2 may be treated in the same meaning as grouping of users of the client apparatuses 2, grouping of local learning data 3, and the like.

(3-1) First Grouping Method

Figure 9:
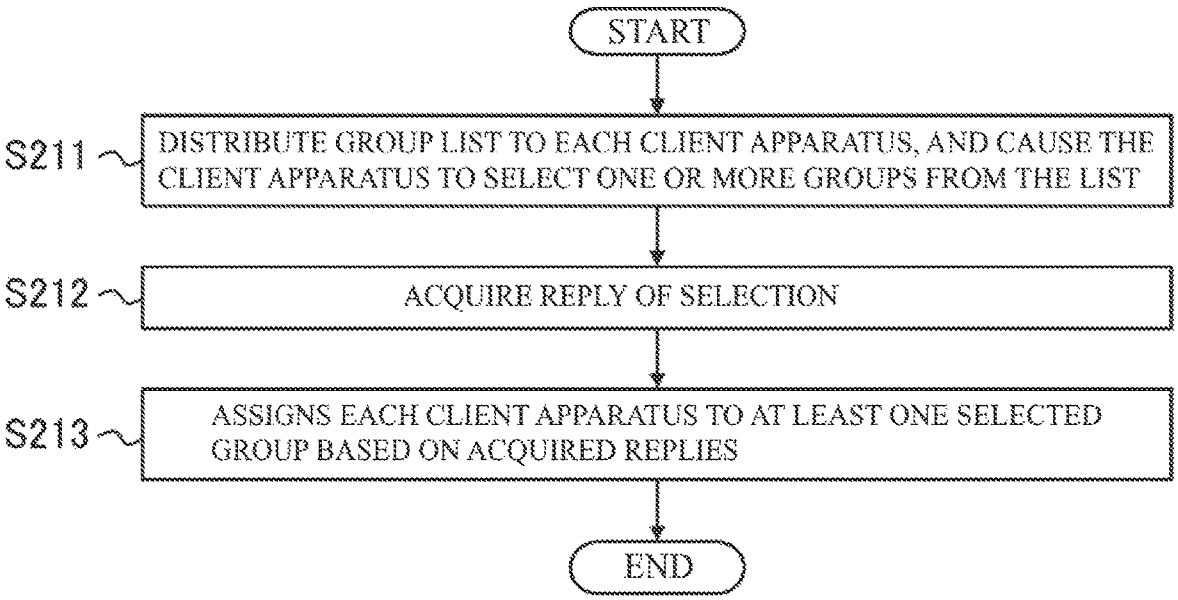
FIG. 9 is a diagram illustrating an example of a procedure of grouping client apparatuses to be executed by an integrated analysis apparatus according to one or more embodiments.

FIG. 9 is a flowchart illustrating an exemplary procedure of a first grouping method. In the first grouping method, the control unit 11 assigns each client apparatus 2 to at least one of a plurality of groups by causing the client apparatus 2 to select a desired group from a group list. Note that when the first grouping method is adopted as the group assigning method, the process of assigning each client apparatus 2 to at least one of the plurality of groups includes the following steps S211 to S213. Note that the procedure described below is merely an example, and the processes may be changed to the extent possible. Moreover, in the procedure described below, steps may also be omitted, replaced, or added as appropriate according to the embodiment.

(Step S211)

In step S211, the control unit 11 distributes a group list 123 listing a plurality of groups to the client apparatuses 2. The distribution method may be selected as appropriate. The control unit 11 may directly distribute the group list 123 to the client apparatuses 2 via a network, as an example. Alternatively, the control unit 11 may also indirectly distribute the group list 123 to the client apparatuses 2 via another computer such as a data server. With this, the control unit 11 causes each client apparatus 2 to select one or more groups from the plurality of groups shown in the group list 123. The groups may be set as appropriate according to the local learning data 3, the client apparatuses 2, the users of the client apparatuses 2, or the like. For example, when the local samples 30 can be used for visual inspection, groups may be set in accordance with attributes such as line number, factory name, or company name. Also, a new group may be set to the group list 123 by request from the client apparatuses 2. An operator of each client apparatus 2 can refer to the group list 123 output to the output apparatus 25, and select at least one desired group from the group list 123 by operating the input apparatus 24. Each client apparatus 2 may select two or more groups. Upon completing the selection, the control unit 21 of each client apparatus 2 returns the reply of group selection to the integrated analysis apparatus 1.

(Steps S212 and S213)

In step S212, the control unit 11 acquires the replies of group selection from the client apparatuses 2. Also, in step S213, the control unit 11 assigns each client apparatus 2 to at least one selected group based on the acquired replies. Upon completing assignment of at least one group, the control unit 11 ends the series of processes regarding the assignment of groups by the first grouping method. According to this first grouping method, grouping of the client apparatuses 2 can be performed with a simple method.

(3-2) Second Grouping Method

Figure 10:
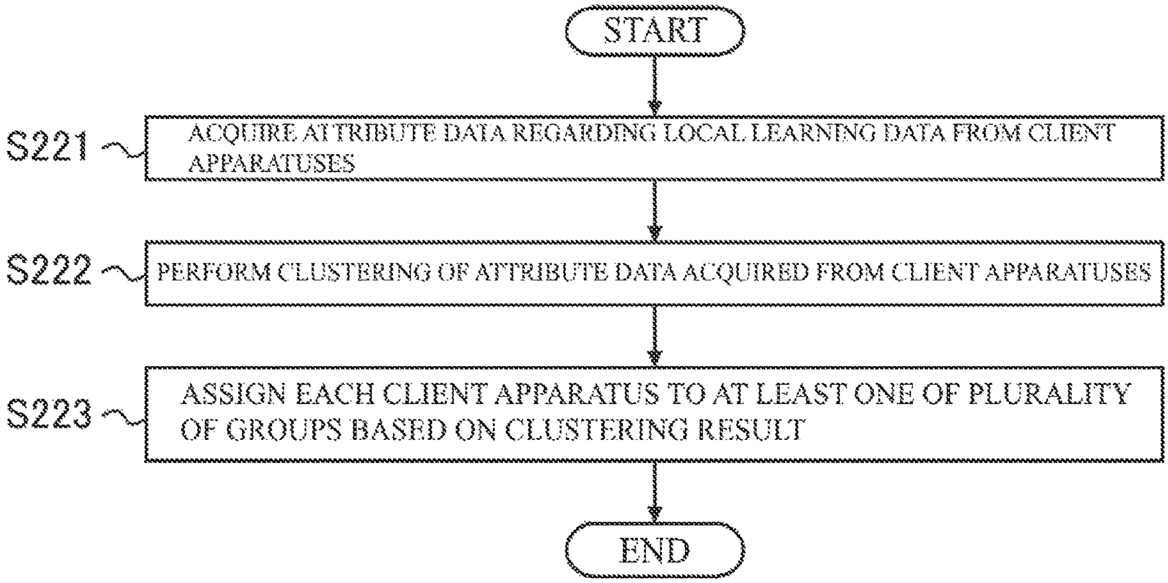
FIG. 10 is a diagram illustrating an example of a procedure of grouping client apparatuses to be executed by an integrated analysis apparatus according to one or more embodiments.

FIG. 10 is a flowchart illustrating an exemplary procedure of a second grouping method. In the second grouping method, the control unit 11 assigns each client apparatus 2 to an appropriate group according to the attribute of its local learning data 3. Note that when the second grouping method is adopted as the method for assigning each client apparatus 2 to a group, the processes of assigning each client apparatus 2 to at least one of a plurality of groups is constituted by the processes in steps S221 to S223 below. Note that the procedure described below is merely an example, and the processes may be changed to the extent possible. Moreover, in the procedure described below, steps may also be omitted, replaced, or added as appropriate depending on the embodiment.

(Step S221)

In step S221, the control unit 11 acquires attribute data regarding the local learning data 3 from the client apparatuses 2. The method for acquiring the attribute data may be determined as appropriate according to the embodiment.

The attribute data may include any information regarding the local learning data 3. The attribute data may include information indicating the data type of local samples 30, information indicating the features appearing in the local samples 30, information indicating the purpose of use of the local samples 30, or the like. The attribute data may be generated when collecting the local learning data 3 in step S101 described above. Upon acquiring the attribute data, the control unit 11 advances the processing to the next step S222.

(Steps S222 and S223)

In step S222, the control unit 11 performs clustering of the attribute data acquired from the client apparatuses 2. The method for clustering is not limited in particular, and may be selected as appropriate depending on the embodiment. A known method such as k-means clustering may be adopted for clustering, for example.

In step S223, the control unit 11 assigns each client apparatus 2 to at least one of the plurality of groups based on the clustering result. The control unit 11 assigns client apparatuses 2 for which acquired attribute data is assigned to the same class to the same group, for example. In this case, each group may be set in accordance with the class of the attribute data. The control unit 11 may also assign each client apparatus 2 to two or more groups based on the clustering result.

Upon completing assignment of groups based on the clustering result, the control unit 11 ends the series of processes regarding the assignment of groups by the second grouping method. According to this second grouping method, the control unit 11 can assign each client apparatus 2 to an appropriate group according to the attribute of the local learning data 3.

In the present embodiment, as a result of adopting at least one of the two methods described above, the control unit 11 can assign each client apparatus 2 to at least one of a plurality of groups. Note that the method of grouping is not limited to these examples, and may be determined as appropriate according to the embodiment.

(4) Usage of Principal Component: Data Compression

FIG. 11 is a flowchart illustrating an example of a procedure of data compression by the client apparatuses 2 according to the embodiment. The data compression is an example of usage of the derived principal components 41. Note that the procedure described below is merely an example, and each step may be changed to the extent possible. Moreover, in the procedure described below, steps may also be omitted, replaced, or added as appropriate according to the embodiment.

(Step S301)

In step S301, the control unit 21 operates as the acquisition unit 211, and acquires object data 223 (sample) to be compressed. The object data 223 is data of the same type as the local sample 30. The object data 223 may be acquired with any method. In the present embodiment, the control unit 21 can generate sensing data by observing an object using a sensor S. The object to be observed may be selected as appropriate according to the embodiment. The control unit 21 may acquire the generated sensing data as the object data 223. Upon acquiring the object data 223, the control unit 21 advances the processing to the next step S302.

(Step S302)

In step S302, the control unit 21 operates as the compression unit 212, refers to the principal component information 121, and acquires a principal component vector (eigenvector V) obtained from one or more principal components 41 derived by the integrated analysis apparatus 1. The control unit 21 projects the object data 223 to a subspace using the acquired principal component vector. That is, the control unit 21 computes the product of the principal component vector and the object data 223. The control unit 21 can generate compressed data 224 by compressing the object data 223 with this computation. The compressed data 224 corresponds to the object data 223 that has been converted to reduce the information amount. Upon completing compression of the object data 223, the control unit 21 advances the processing to the next step S303.

(Step S303)

In step S303, the control unit 21 operates as the output unit 213, and outputs the generated compressed data 224.

The output format of the compressed data 224 may be determined as appropriate according to the embodiment. For example, the control unit 21 may output the compressed data 224 to the output apparatus 25. Also, the control unit 21 may save the compressed data 224 in a predetermined storage area, for example. The predetermined storage area may be the RAM in the control unit 21, the storage unit 22, an external storage apparatus, or a storage medium, or a combination of these, for example. The generated compressed data 224 may also be provided to another computer.

Upon completing outputting of the compressed data 224, the control unit 21 ends the series of processes regarding the data compression.

(5) Usage of Principal Component: Inference

FIG. 12 is a flowchart illustrating a procedure regarding predetermined inference by each client apparatus 2 according to the present embodiment. "Inference" is an example of usage of derived principal components 41. Note that the procedure is merely an example, and each step may be changed to the extent possible. Moreover, in the procedure described below, steps may also be omitted, replaced, or added as appropriate depending on the embodiment.

(Step S311)

In step S311, the control unit 21 operates as the acquisition unit 215, and acquires object data 226 (sample) regarding which inference is performed. The object data 226 is data of the same type as the local sample 30. Step S311 may be similar to step S301 described above. In the present embodiment, the control unit 21 can acquire object data 226 using a sensor S. Upon acquiring object data 226, the control unit 21 advances the processing to the next step S312.

(Steps S312 to S314)

In steps S312 to S314, the control unit 21 operates as the inference unit 216, and infers a feature included in the object data 226 using one or more derived principal components 41. In the present embodiment, the class of a feature included in the object data 226 is identified based on comparison between the object data 226 and samples 228 included in the data group 227, in the subspace, as an example of inference.

Specifically, in step S312, the control unit 21 refers to the principal component information 121, and acquires a principal component vector (eigenvector V) obtained from the one or more principal components 41 derived by the integrated analysis apparatus 1. The control unit 21 projects the object data 226 in the subspace using the acquired principal component vector. With this, the control unit 21 acquires a feature amount 2261.

Similarly, the samples 228 are converted to feature amounts 2281 using the principal component vector. The conversion of the samples 228 may be executed in advance. The samples 228 include features of corresponding categories. For example, when visual inspection is performed by class identification, image data including images of products including a defect of the type according to the category of interest may be used as the samples 228, for example. Alternatively, image data including images of products including no defect may be used as the samples 228, in correspondence with the category of "good products". The number of set categories may be determined as appropriate.

In step S313, the control unit 21 compares, in the subspace, the obtained feature amount 2261 with the feature amounts 2281. In step S314, the control unit 21 identifies whether or not the feature included in the object data 226 belongs to the category of interest, based on the comparison result. The comparison method may be determined as appropriate. In the present embodiment, the range of the category of interest can be determined in the subspace, from the feature amounts 2281 obtained from the samples 228. Here, the boundary for defining the range of the category of interest may be set from the feature amounts 2281 obtained from the samples 228. The boundary may be expressed as appropriate by a function or the like. The control unit 21 may determine whether or not the obtained feature amount 2261 is included in the range of the category of interest based on the set boundary. The control unit 21 may also identify whether or not the feature included in the object data 226 belongs to the category of interest based on the determination result. Alternatively, the control unit 21 calculates distances between the obtained feature amount 2261 and the feature amounts 2281 obtained from the samples 228 belonging to the category of interest. The control unit 21 may identify whether or not the feature included in the object data 226 belongs to the category of interest based on the calculated distances. Upon completing inference regarding the object data 226, the control unit 21 advances the processing to the next step S315.

(Step S315)

In step S315, the control unit 21 operates as the output unit 217, and outputs information regarding the inference result.

The output destination and information details to be output may be determined as appropriate according to the embodiment. For example, the control unit 21 may output the identification result in step S314 to the output apparatus 25 as is. Also, the control unit 21 may execute some information process based on the identification result in step S314, for example. Then, the control unit 21 may output the result of executing the information process as the information regarding the inference result. Outputting the result of executing the information process may include outputting a specific message according to the inference result, controlling the operation of an apparatus to be controlled according to the inference result, or the like. The output destination may be the output apparatus 25, an output apparatus of another computer, an apparatus to be controlled, or the like.

Upon completing outputting the information regarding the inference result, the control unit 21 ends the series of processes regarding the predetermined inference. Note that the control unit 21 may continuously and repeatedly execute the series of information processes in steps S311 to S315 for a predetermined period of time. The repetition timing may be determined as appropriate. With this, the client apparatuses 2 may continuously perform predetermined inference.

[Features]

As described above, in the present embodiment, instead of the local learning data 3 itself, the results 51 of computation regarding a correlation between elements of local learning data 3 are gathered in the integrated analysis apparatus 1. Accordingly, the cost of exchanging data between the client apparatuses 2 and the integrated analysis apparatus 1 in step S201 described above can be reduced. Also, the client apparatuses 2 can be caused to perform some of the series of calculation processes for deriving one or more principal components 41 from all of the local learning data. In the present embodiment, in step S102 described above, the client apparatuses 2 can be caused to perform the process for calculating an autocorrelation matrix of local learning data 3. Accordingly, the local learning data 3 collected separately by the client apparatuses 2 can be reflected on principal component analysis, and the calculation cost of the integrated analysis apparatus 1 can be reduced by an amount corresponding to the calculation needed until the autocorrelation matrices are calculated. Therefore, according to the present embodiment, the quality of data analysis by principal component analysis can be improved while suppressing an increase in cost. As a result of using one or more derived principal components 41, in the case of data compression described above, useful information is unlikely to be deleted in step S302. Also, in the case of inference described above, the accuracy of inference in steps S312 to S314 can be improved.

4. Modifications

Although an embodiment of the present invention has been described above in detail, the above descriptions are merely examples of the present invention in all aspects. Needless to say, various improvements and modifications can be made without departing from the scope of the present invention. For example, the following modifications are possible. Note that, in the following description, the same constituent elements as the constituent elements described in the above embodiment are assigned the same reference numerals, and descriptions of the same points as the points described in the above embodiment are omitted as appropriate. The following modifications may be combined as appropriate.

<4.1>

The system 100 according to the embodiment may be applied to any scenario in which one or more principal components are derived from local learning data collected for various purposes. The purpose of collecting local learning data 3 may be performing tasks such as visual inspection, cultivation conditions monitoring, subject state monitoring, or machine state monitoring. In the following, modifications in which the application scenario is limited will be illustrated.

(A) Scenario of Visual Inspection

Figure 13:
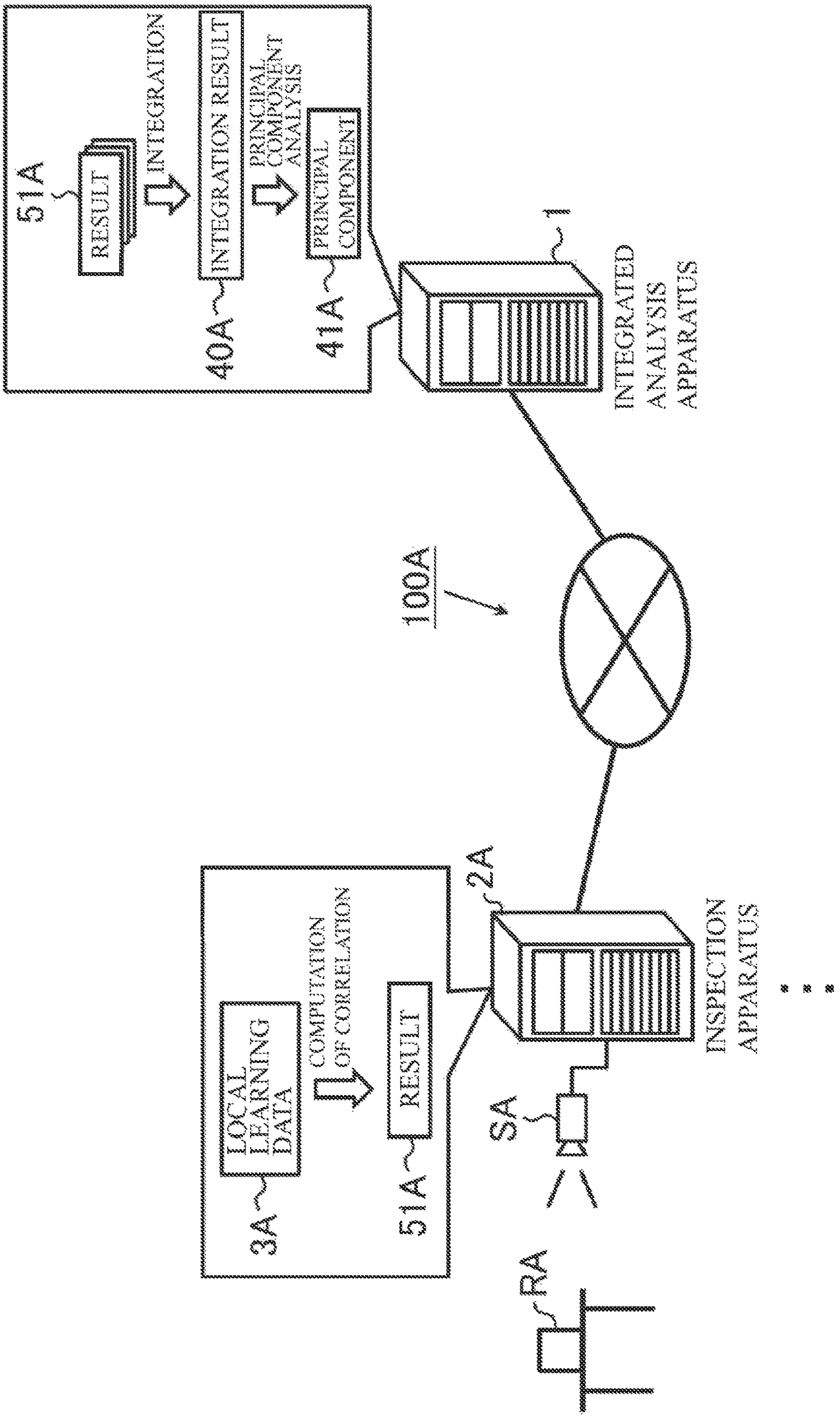
FIG. 13 is a schematic diagram illustrating an example of another scenario to which one or more embodiments may be applied.

FIG. 13 schematically illustrates an example of the application scenario of an inspection system 100A according to a first modification. This modification is an example in which the embodiment described above is applied to a scenario in which principal component analysis is applied on data obtained by observing the state of products RA. The inspection system 100A according to this modification includes the integrated analysis apparatus 1 and a plurality of inspection apparatuses 2A. Similarly to the embodiment described above, the integrated analysis apparatus 1 and the inspection apparatuses 2A may be connected via a network.

In this modification, the local learning data 3A is constituted by image data of products RA or measurement data obtained by measuring attributes of the products RA. The image data may be obtained by shooting the products RA with a camera SA. In this case, the pixels of image data correspond to elements of a local sample. Also, a configuration may be adopted in which the attributes of the products RA are observed by a sensor such as a camera SA, and the measurement data is constituted by measurement values of the attributes calculated from the obtained sensing data, for example. The attributes of the products RA to be measured may be selected as appropriate. The attributes of the products RA may be width, thickness, shape, color, inclination, bumps and dips, texture, or the like. The texture of the product RA may be defined by tactile feeling (e.g., rough/smooth, degree of surface roughness), material (e.g., metal/plastic), or the like. In this case, the measurement values of the attributes correspond to the elements of a local sample. The inspection system 100A according to this modification may be similarly configured to the system 100 according to the embodiment described above, except for these restrictions.

Note that the product RA may be a product that is conveyed in a production line, such as an electronic apparatus, an electronic component, an automotive component, medicine, or food, for example. The electronic component may be a substrate, a chip capacitor, liquid crystal, or a relay winding wire, for example. The automotive component may be a connecting rod, a shaft, an engine block, a power window switch, or a panel, for example. The medicine may be a packaged tablet, or a tablet that is not packaged, for example. The product RA may be a final product that is generated after completing production processes, an intermediate product that is generated in the middle of production processes, or an initial product that is prepared before being introduced into production processes. Also, the defect to be detected by the visual inspection may be a flaw, a smudge, a crack, a hit, a burr, uneven color, or contamination, for example. The inference regarding defects may be constituted by determining whether or not a defect is included in the product RA, determining the probability that a defect is included in the product RA, identifying the type of a defect included in the product RA, or specifying the range of a defect included in the product RA, or a combination of these.

(Inspection Apparatus)

The inspection apparatuses 2A according to this modification correspond to the client apparatus 2 described in the above embodiment. The hardware configuration and software configuration of the inspection apparatuses 2A according to this modification may be similar to those of the client apparatuses 2 according to the embodiment described above. Accordingly, the information processes of the inspection apparatuses 2A may be executed with a procedure similar to that of the client apparatuses 2.

In step S101 described above, the inspection apparatuses 2A collects local learning data 3A. The local learning data 3A is constituted by a plurality of local samples that are image data of products RA or measurement data obtained by measuring attributes of the products RA. A camera SA may be used to acquire a local sample. In step S102 described above, the inspection apparatuses 2A each calculate a result 51A of computation regarding a correlation between elements of the local learning data 3A. The inspection apparatuses 2A can calculate autocorrelation matrices of the local learning data 3A as the results 51A of computation by executing the processes in steps S1021 to S1023 described above. In step S103, the inspection apparatuses 2A output the calculated computation results 51A.

(Integrated Analysis Apparatus)

In the modification, the integrated analysis apparatus 1 derives one or more principal components 41A with respect to image data of products RA or measurement data obtained by measuring attributes of the products RA. Specifically, in step S201 described above, the integrated analysis apparatus 1 acquires the results 51A of computation regarding a correlation from the inspection apparatuses 2A. In step S202 described above, the integrated analysis apparatus 1 calculates an integration result 40A indicating the correlation between the elements of all of the local samples included in all of the local learning data, by integrating the computation results 51A acquired from the inspection apparatuses 2A. With the computation process described above, the integrated analysis apparatus 1 can acquire a variance-covariance matrix of all of the local learning data as an integration result 40A. In step S203 described above, the integrated analysis apparatus 1 derives one or more principal components 41A from the calculated integration result 40A by executing principal component analysis. In step S204, the integrated analysis apparatus 1 outputs information regarding the one or more derived principal components 41A.

(Usage of Principal Components)

The one or more derived principal components 41A may be used in any application. Also, information regarding the one or more derived principal components 41A may be provided to the inspection apparatuses 2A at any timing. The inspection apparatuses 2A can compress object data using the one or more derived principal components 41A with the processes in steps S301 to S303 described above. Also, the inspection apparatuses 2A can identify the states of products RA in the object data using the one or more calculated principal components 41A with the processes in steps S311 to S315.

When data of normal products RA including no defects is used as the samples constituting a data group, if the object data is identified as belonging to the category of interest in step S314, the inspection apparatuses 2A can determine that the product RA in the object data does not include a defect (that is, the product RA is normal). On the other hand, if the object data is identified as not belonging to the category of interest, the inspection apparatuses 2A can determine that the product RA in the object data includes a defect.

Also, when data of products RA including a specific defect is used as samples constituting a data group, if the object data is identified as belonging to the category of interest in step S314, the inspection apparatuses 2A can determine that the product RA in the object data includes a defect of the type corresponding to the category of interest. On the other hand, if the object data is identified as not belonging to the category of interest, the inspection apparatuses 2A can determine that the product RA in the object data includes no defects.

In step S315 described above, the inspection apparatuses 2A output information regarding the results of inference with respect to defects of products RA. For example, the inspection apparatuses 2A may output information regarding the results of inference with respect to defects of products RA to an output apparatus as is. Also, if it is determined that a defect is present in a product RA, the inspection apparatuses 2A may output a warning for notifying this fact to an output apparatus. Also, when the inspection apparatuses 2A are connected to a conveyor apparatus that conveys the products RA, the inspection apparatuses 2A may control the conveyor apparatus such that products having no defect and products having defects are conveyed in different lines, based on the result of inference with respect to defects, for example.

(Features)

According to this modification, with respect to data that can be used for visual inspection, the quality of data analysis by principal component analysis can be improved while suppressing an increase in cost. Accordingly, in the case of data compression described above, as a result of using one or more derived principal components 41A, information useful for visual inspection can be hardly deleted. Also, in the case of inference described above, the accuracy of visual inspection can be improved with steps S312 to S314.

(B) Scenario of Monitoring Cultivation Condition

Figure 14:
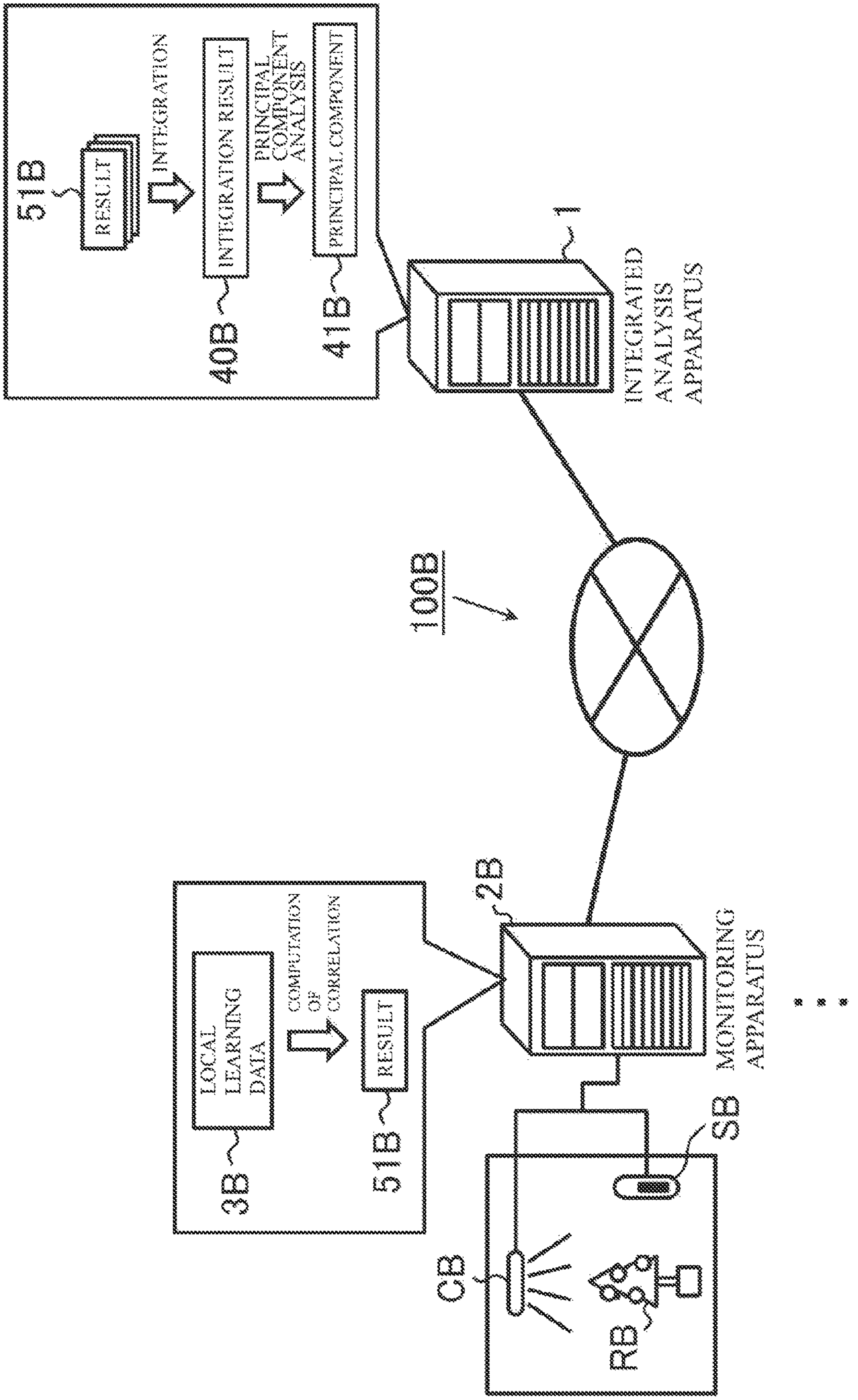
FIG. 14 is a schematic diagram illustrating an example of another scenario to which one or more embodiments may be applied.

FIG. 14 schematically illustrates an example of a scenario to which a monitoring system 100B according to a second modification is applied. This modification is an example in which the embodiment described above is applied to a scenario in which principal component analysis is performed on observation data regarding a plant RB. The monitoring system 100B according to this modification includes the integrated analysis apparatus 1 and a plurality of monitoring apparatuses 2B. Similarly to the embodiment described above, the integrated analysis apparatus 1 and the monitoring apparatuses 2B may be connected via a network.

In this modification, the local learning data 3B is observation data regarding the plant RB. The observation data may be constituted by sensing data obtained by an environment sensor SB observing the condition of the plant RB or observation data of the plant RB obtained by an input made by an operator, or a combination of these, for example. The type of the environment sensor SB is not limited in particular, as long as the cultivation conditions of the plant RB can be observed, and may be selected as appropriate according to the embodiment. The environment sensor SB may be a barometer, a thermometer, a hygrometer, a sound pressure sensor, a sound sensor, an ultraviolet sensor, an illumination meter, a precipitation gauge, or a gas sensor, for example. The type of the plant RB may be selected as appropriate. The cultivation conditions to be monitored may be conditions regarding any element relating to cultivation of the plant RB. The cultivation conditions may be specified by the growth environment until the time of cultivation, the growth state, or the like. The growth environment relates to the conditions of growing the plant RB, and may be specified by the time for irradiating the plant RB with light, the temperature around the plant RB, the amount of water to the plant RB, and the like. The growth state may be specified by the growth degree of the plant RB or the like. The observation data may be constituted by work record data or environment record data, or a combination of these. The work record data may be constituted by information indicating whether or not a task such as flower thinning, leaves thinning, or disbudding has been performed, and the execution date and time and amount of the task, for example. Also, the environment record data may be constituted by information indicating the result obtained by an operator observing the environment (e.g., weather, temperature, humidity, etc.) around the plant RB. The monitoring system 100B according to this modification may be similarly configured to the system 100 according to the embodiment, except for these restrictions.

(Monitoring Apparatus)

The monitoring apparatuses 2B according to this modification correspond to the client apparatuses 2 according to the embodiment described above. The hardware configuration and software configuration of the monitoring apparatuses 2B according to this modification may be similar to those of the client apparatuses 2 according to the embodiment described above. Accordingly, the information processes of the monitoring apparatuses 2B may be executed with a procedure similar to that of the client apparatuses 2.

In step S101 described above, the monitoring apparatuses 2B collect local learning data 3B. The local learning data 3B is constituted by a plurality of local samples of observation data regarding the plant RB. The local samples may be obtained by at least one of the environment sensor SB and an input made by an operator. In step S102 described above, the monitoring apparatuses 2B each calculate a result 51B of computation regarding a correlation between elements of the local learning data 3B. The monitoring apparatuses 2B can calculate autocorrelation matrices of the local learning data 3B as the results 51B of computation by executing the processes in steps S1021 to S1023 described above. In step S103, the monitoring apparatuses 2B output the calculated computation results 51B.

(Integrated Analysis Apparatus)

In this modification, the integrated analysis apparatus 1 derives one or more principal components 41B with respect to observation data regarding the plant RB. Specifically, in step S201 described above, the integrated analysis apparatus 1 acquires the results 51B of computation regarding correlation from the monitoring apparatuses 2B. In step S202 described above, the integrated analysis apparatus 1 calculates an integration result 40B indicating the correlation between the elements of all of the local samples included in all of the local learning data, by integrating the computation results 51B acquired from the monitoring apparatuses 2B. With the computation process described above, the integrated analysis apparatus 1 can acquire a variance-covariance matrix of all of the local learning data as the integration result 40B. In step S203 described above, the integrated analysis apparatus 1 derives one or more principal components 41B from the calculated integration result 40B by executing principal component analysis. In step S204, the integrated analysis apparatus 1 outputs information regarding the one or more derived principal components 41B.

(Usage of Principal Components)

The one or more derived principal components 41B may be used in any application. Also, information regarding the one or more derived principal components 41B may be provided to the monitoring apparatuses 2B at any timing. The monitoring apparatuses 2B can compress object data using the one or more derived principal components 41B with the processes in steps S301 to S303 described above. Also, the monitoring apparatuses 2B can infer the cultivation conditions of the plant RB in the object data using the calculated one or more principal components 41B, with the processes in steps S311 to S315. Note that inferring the cultivation conditions may include estimating at least one of the growth environment and work contents with which the yield is to be maximized, estimating the most suitable work contents in the current growth environment that is observed, or the like.

In step S315 described above, the monitoring apparatuses 2B output information regarding the results of inferring the cultivation conditions of the plants RB. For example, the monitoring apparatuses 2B may output information regarding the results of inferring the cultivation conditions of the plants RB to output apparatuses as is. In this case, the monitoring apparatuses 2B may prompt an operator to improve the cultivation conditions of the plants RB by outputting one of the growth environment and work contents with which the yield is maximized, and the estimation result of the most suitable work contents in the current growth environment that is observed. Also, the monitoring apparatuses 2B may be connected to cultivation apparatuses CB, for example. The cultivation apparatus CB is configured to control the growth environment of a plant RB. In this case, the monitoring apparatuses 2B may determine the control instructions to be given to the cultivation apparatus CB according to the result of inferring the cultivation conditions. The correspondence relationship between the cultivation conditions and the control instructions may be given by reference information in a table format or the like. The reference information may be stored in a RAM, a ROM, a storage unit, a storage medium, an external storage apparatus, or the like, and the monitoring apparatuses 2B may determine the control instructions according to the estimated cultivation conditions by referring to the reference information. Also, the monitoring apparatuses 2B may control the operations of the cultivation apparatuses CB by giving the determined control instructions to the cultivation apparatuses CB. Also, the monitoring apparatuses 2B may output information indicating the determined control instructions to output apparatuses, and prompt the manager of the plants RB to control the operations of the cultivation apparatuses CB.

Note that, the type of the cultivation apparatus CB is not limited in particular and may be selected as appropriate according to the embodiment, as long as it is able to control the growth environment of the plant RB. The cultivation apparatus CB may be a curtain apparatus, an illumination apparatus, air conditioning equipment, a water sprinkling apparatus, or the like. The curtain apparatus is configured to open and close a curtain attached to a window of a building. The illumination apparatus is LED (light emitting diode) illumination, a fluorescent light, or the like. The air conditioning equipment is an air conditioner or the like. The water sprinkling apparatus is a sprinkler or the like. The curtain apparatus and the illumination apparatus are used to control the time for irradiating the plant RB with light. The air conditioning equipment is used for controlling the temperature around the plant RB. The water sprinkling apparatus is used to control the amount of water supplied to the plant RB.

(Features)

According to this modification, with respect to observation data that can be used to monitor the cultivation conditions of the plants RB, the quality of data analysis by principal component analysis can be improved while suppressing an increase in cost. Accordingly, in the case of data compression described above, as a result of using one or more derived principal components 41B, information useful to monitor the cultivation conditions of the plants RB can be hardly deleted. Also, in the case of inference described above, the accuracy of inferring the cultivation conditions of the plants RB can be improved with steps S312 to S314.

(C) Scenario of Diagnosing Health Status

Figure 15:
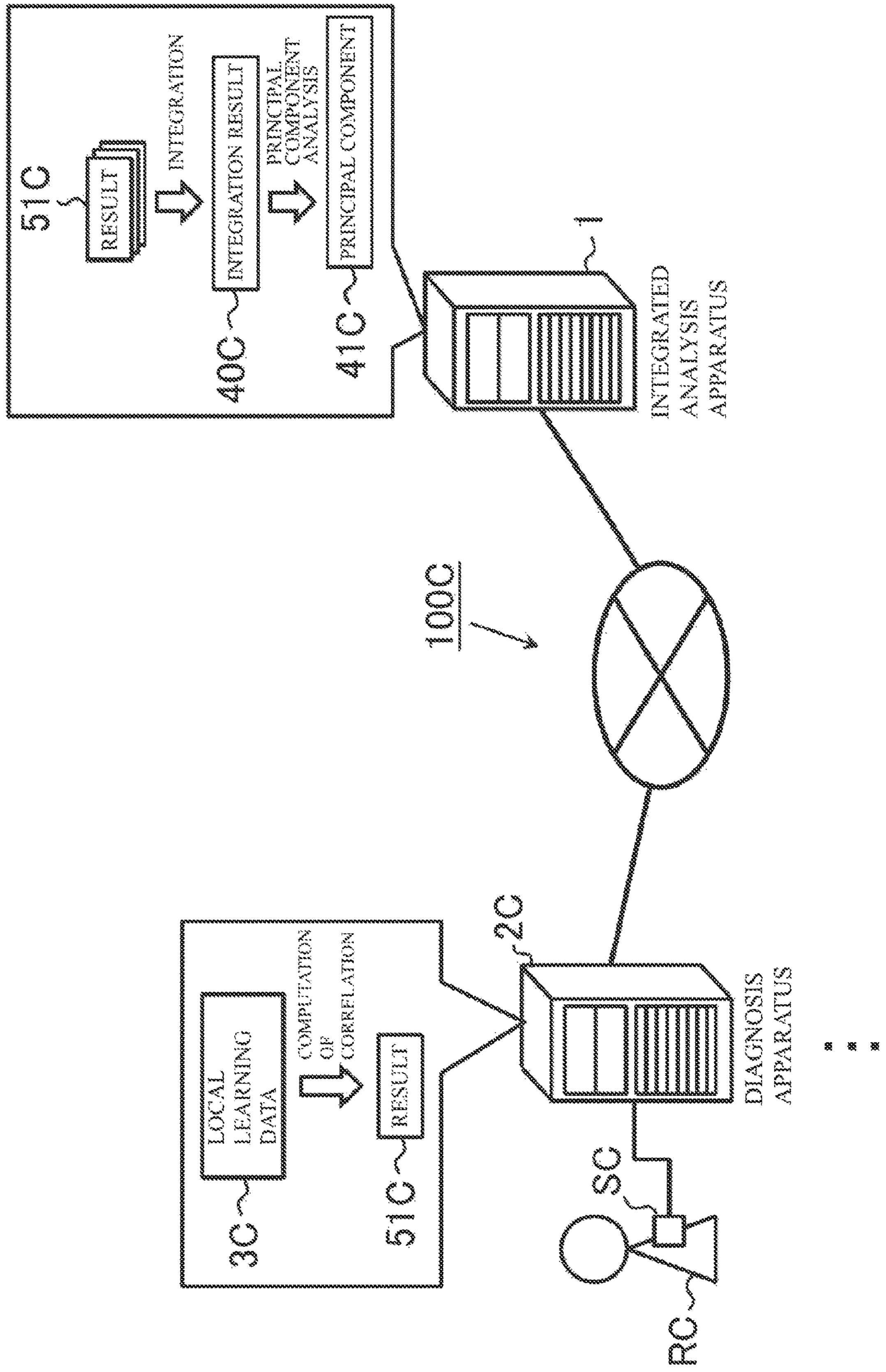
FIG. 15 is a schematic diagram illustrating an example of another scenario to which one or more embodiments may be applied.

FIG. 15 schematically illustrates an example of a scenario to which a diagnostic system 100C according to a third modification is applied. This modification is an example in which the embodiment described above is applied to a scenario in which principal component analysis is performed on sensing data obtained by a sensor SC for observing the state of a subject RC. The diagnostic system 100C according to this modification includes the integrated analysis apparatus 1 and a plurality of diagnosis apparatuses 2C. Similarly to the embodiment described above, the integrated analysis apparatus 1 and the diagnosis apparatuses 2C may be connected via a network.

In this modification, local learning data 3C is sensing data obtained by a sensor SC. The type of the sensor SC is not limited in particular, and may be selected as appropriate according to the embodiment, as long as it is able to observe the state of the subject RC. The sensor SC may be a vital sensor, a medical examination apparatus, or the like. The vital sensor may be a blood-pressure gauge, a pulsimeter, a heart rate meter, an electrocardiographic monitor, an electromyograph, a clinical thermometer, an electro dermal activity sensor, a microwave sensor, an electroencephalograph, a magnetoencephalograph, an activity tracker, a glucometer, an ocular potentiometer, or an eye movement measuring instrument, for example. The medical examination apparatus may be a CT apparatus, an MRI apparatus, or the like. Inferring the health status may include determining whether the examinee is healthy or not, determining whether or not there is a sign of falling ill, identifying the type of health status, or determining the probability of falling ill of interest, or a combination of these, for example. The diagnostic system 100C according to this modification may be similarly configured to the system 100 according to the embodiment, except for these restrictions.

(Diagnosis Apparatus)

The diagnosis apparatuses 2C according to this modification correspond to the client apparatuses 2 according to the embodiment described above. The hardware configuration and software configuration of the diagnosis apparatuses 2C according to this modification may be similar to those of the client apparatuses 2 according to the embodiment described above. Accordingly, the information processes of the diagnosis apparatus 2C may be executed with a procedure similar to that of the client apparatuses 2.

In step S101 described above, the diagnosis apparatuses 2C collect local learning data 3C. The local learning data 3C is constituted by a plurality of local samples of sensing data obtained by sensors SC. In step S102 described above, the diagnosis apparatuses 2C each calculate a result 51C of computation regarding a correlation between elements of the local learning data 3C. The diagnosis apparatuses 2C can calculate autocorrelation matrices of the local learning data 3C as the results 51C of computation by executing the processes in steps S1021 to S1023 described above. In step S103, the diagnosis apparatuses 2C output the calculated computation results 51C.

(Integrated Analysis Apparatus)

In this modification, the integrated analysis apparatus 1 derives one or more principal components 41C with respect to sensing data obtained by the sensors SC. Specifically, in step S201 described above, the integrated analysis apparatus 1 acquires the results 51C of computation regarding correlation from the diagnosis apparatuses 2C. In step S202 described above, the integrated analysis apparatus 1 calculates an integration result 40C indicating the correlation between the elements of all of the local samples included in all of the local learning data, by integrating the computation results 51C acquired from the diagnosis apparatuses 2C. With the computation process described above, the integrated analysis apparatus 1 can acquire a variance-covariance matrix of all of the local learning data as the integration result 40C. In step S203 described above, the integrated analysis apparatus 1 derives one or more principal components 41C from the calculated integration result 40C by executing principal component analysis. In step S204, the integrated analysis apparatus 1 outputs information regarding the one or more derived principal components 41C.

(Usage of Principal Components)

The one or more derived principal components 41C may be used in any application. Also, information regarding the one or more derived principal components 41C may be provided to the diagnosis apparatuses 2C at any timing. The diagnosis apparatuses 2C can compress object data using the one or more derived principal components 41C with the processes in steps S301 to S303 described above. Also, the diagnosis apparatuses 2C can identify the health statuses of subjects RC in the object data using the calculated one or more principal components 41C, with the processes in steps S311 to S315.

In step S315 described above, the diagnosis apparatuses 2C output information regarding the result of inferring the health statuses of the subjects RC. For example, the diagnosis apparatuses 2C may output the results of inferring the health statuses of the subjects RC to output apparatuses as is. Also, when the inferred health status of a subject RC indicates a sign of a predetermined illness, the corresponding diagnosis apparatus 2C may also output a message prompting to receive examination at a hospital to the output apparatus. Also, the diagnosis apparatus 2C may transmit the result of inferring the health status of the subject RC to a terminal of a registered hospital, for example. Note that the information regarding a terminal to which information is transmitted may be stored in a predetermined storage area such as a RAM, a ROM, a storage unit, a storage medium, or an external storage apparatus.

(Features)

According to this modification, with respect to sensing data that can be used to monitor the health statuses of the subjects RC, the quality of data analysis by principal component analysis can be improved while suppressing an increase in cost. Accordingly, in the case of data compression described above, as a result of using the one or more derived principal components 41C, information useful to monitor the health statuses of the subjects RC can be hardly deleted. Also, in the case of inference described above, the accuracy of inferring the health statuses of the subjects RC can be improved with steps S312 to S314. Note that the scenario of diagnosing the health statuses of the subjects RC according to this modification is an example of a scenario in which the state of a subject is inferred. Note that the scenario in which the state of a subject is inferred is not limited to the scenario in which the health status is diagnosed. Also, the subject may not be the same between the phase in which the local learning data is acquired and the phase in which the principal components are used.

(D) Scenario of Monitoring the State of Drivers

Figure 16:
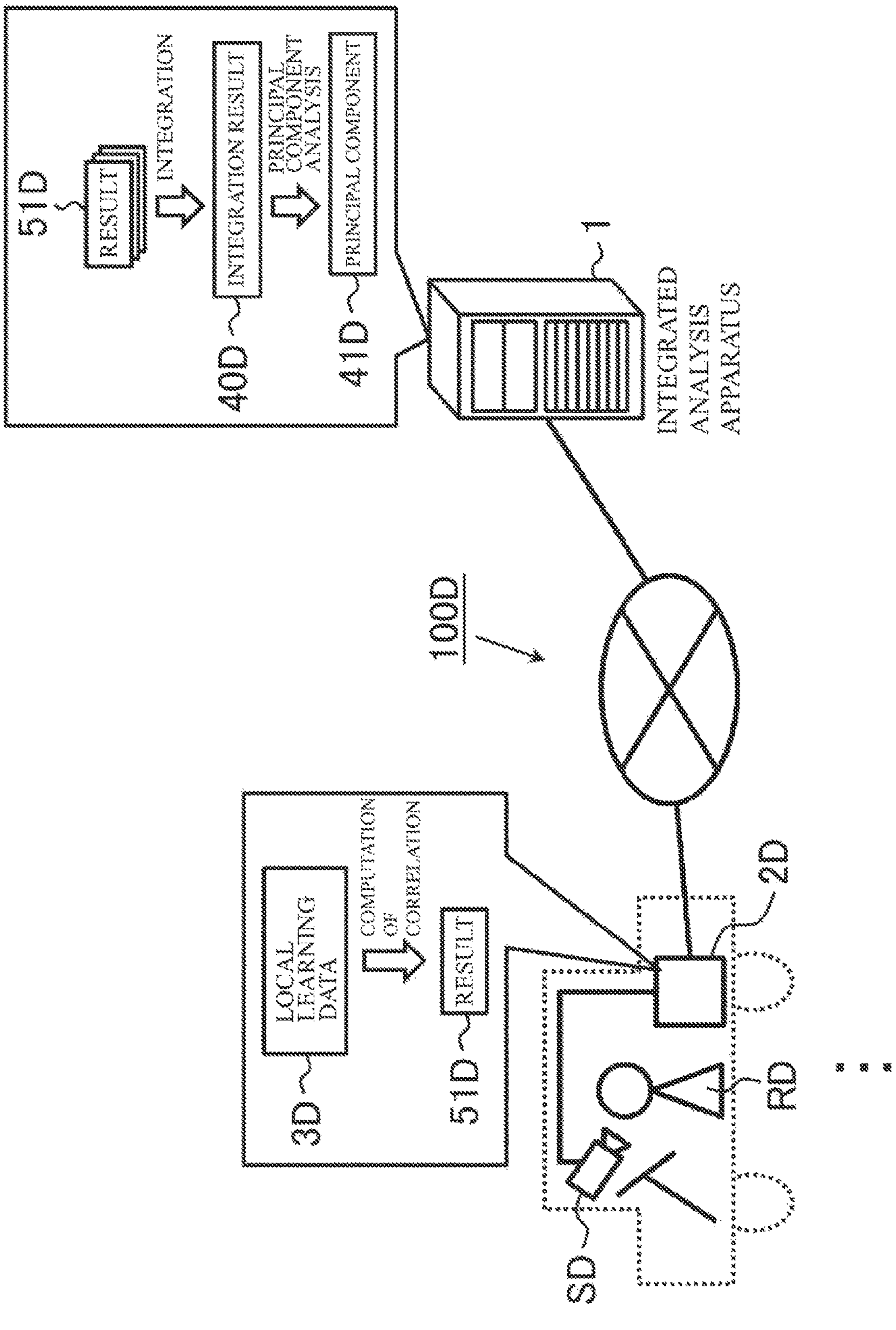
FIG. 16 is a schematic diagram illustrating an example of another scenario to which one or more embodiments may be applied.

FIG. 16 schematically illustrates an example of a scenario to which a monitoring system 100D according to a fourth modification is applied. This modification is an example in which the embodiment described above is applied to a scenario in which principal component analysis is performed on sensing data acquired by a sensor SD for observing the state of a driver RD. The scenario of monitoring the state of the driver RD according to this modification is another example of the scenario of inferring the state of a subject described above. The monitoring system 100D according to this modification includes the integrated analysis apparatus 1 and a plurality of monitoring apparatuses 2D. Similarly to the embodiment described above, the integrated analysis apparatus 1 and the monitoring apparatuses 2D may be connected via a network.

In this modification, local learning data 3D is sensing data obtained by a sensor SD. The type of the sensor SD is not limited in particular, and may be selected as appropriate according to the embodiment, as long as it is able to observe the state of a driver RD. The sensor SD may be a camera, an infrared sensor, a microphone, or a vital sensor, for example. The state of the driver RD may include posture, behavior, a sleepiness degree, a fatigue degree, or a margin of capability, for example. The sleepiness degree indicates the degree of sleepiness of the driver RD. The fatigue degree indicates the degree of fatigue of the driver RD. The margin of capability indicates the margin of capability of the driver RD regarding driving. The monitoring system 100D according to this modification may be similarly configured to the system 100 according to the embodiment, except for these restrictions.

(Monitoring Apparatus)

The monitoring apparatuses 2D according to this modification correspond to the client apparatuses 2 according to the embodiment described above. The hardware configuration and software configuration of the monitoring apparatuses 2D according to this modification may be similar to those of the client apparatuses 2 according to the embodiment described above. Accordingly, the information processes of the monitoring apparatuses 2D may be executed with a procedure similar to that of the client apparatuses 2.

In step S101 described above, the monitoring apparatuses 2D collect local learning data 3D. The local learning data 3D is constituted by a plurality of local samples of sensing data obtained by a sensor SD. In step S102 described above, the monitoring apparatuses 2D each calculate a result 51D of computation regarding a correlation between elements of the local learning data 3D. The monitoring apparatuses 2D can calculate autocorrelation matrices of the local learning data 3D as the results 51D of computation by executing the processes in steps S1021 to S1023 described above. In step S103, the monitoring apparatuses 2D output the calculated computation results 51D.

(Integrated Analysis Apparatus)

In this modification, the integrated analysis apparatus 1 derives one or more principal components 41D with respect to sensing data obtained by the sensors SD. Specifically, in step S201 described above, the integrated analysis apparatus 1 acquires the results 51D of computation regarding correlation from the monitoring apparatuses 2D. In step S202 described above, the integrated analysis apparatus 1 calculates an integration result 40D indicating the correlation between the elements of all of the local samples included in all of the local learning data, by integrating the computation results 51D acquired from the monitoring apparatuses 2D. With the computation process described above, the integrated analysis apparatus 1 can acquire a variance-covariance matrix of all of the local learning data as the integration result 40D. In step S203 described above, the integrated analysis apparatus 1 derives one or more principal components 41D from the calculated integration result 40D by executing principal component analysis. In step S204 described above, the integrated analysis apparatus 1 outputs information regarding the one or more derived principal components 41D.

(Usage of Principal Components)

The one or more derived principal components 41D may be used in any application. Also, information regarding the one or more derived principal components 41D may be provided to the monitoring apparatuses 2D at any timing. The monitoring apparatuses 2D can compress object data using the one or more derived principal components 41D with the processes in steps S301 to S303 described above. Also, the monitoring apparatuses 2D can each identify the state of a driver RD in object data using the calculated one or more principal components 41D, with the processes in steps S311 to S315.

In step S315 described above, the monitoring apparatuses 2D outputs information regarding the results of inferring the states of drivers RD. For example, the monitoring apparatuses 2D may output the results of inferring the states of the drivers RD to an output apparatus as is. Also, when it is determined that it is better not to continue driving based on the result of inferring the state of a driver RD that indicates at least one of the sleepiness degree and the fatigue degree exceeds a threshold value or the like, the corresponding monitoring apparatus 2D may output a warning prompting the driver RD to stop the vehicle and take a rest to the output apparatus. Also, when the monitoring apparatuses 2D are connected to control apparatuses (not illustrated) that control the operations of vehicles, the monitoring apparatuses 2D may determine the commands for instructing the desired operations to the vehicles according to the results of inferring the states of the drivers RD, for example. The monitoring apparatuses 2D may control the operations of the vehicle by giving the determined commands to the control apparatuses. Note that one monitoring apparatus 2D and one control apparatus may be constituted by one computer.

(Features)

According to this modification, with respect to sensing data that can be used to monitor the states of the drivers RD, the quality of data analysis by principal component analysis can be improved while suppressing an increase in cost. Accordingly, in the case of data compression described above, as a result of using the one or more derived principal components 41D, information useful to monitor the states of the drivers RD can be hardly deleted. Also, in the case of inference described above, the accuracy of inferring the states of the drivers RD can be improved with steps S312 to S314.

(E) Scenario of Detecting Anomaly of Machines

Figure 17:
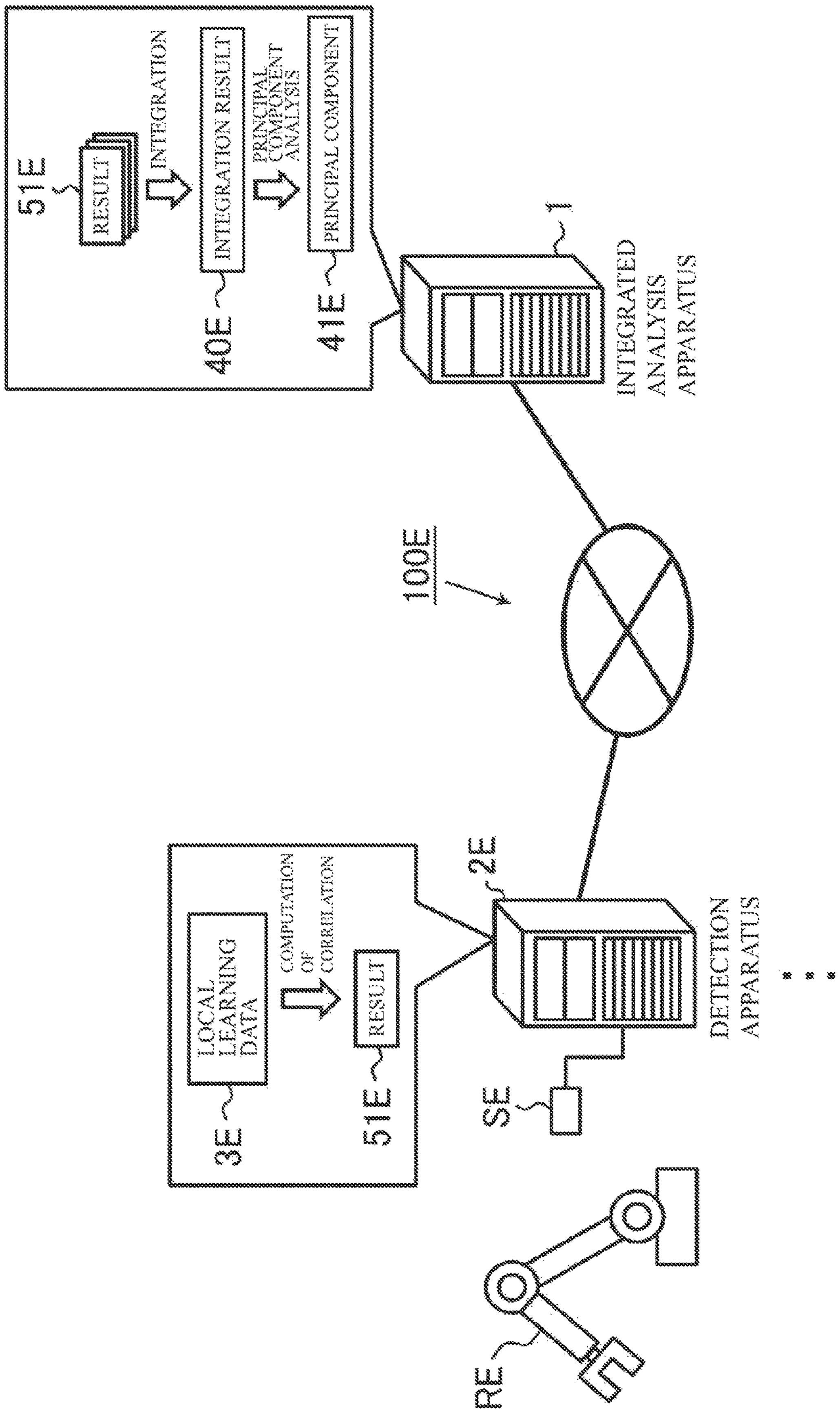
FIG. 17 is a schematic diagram illustrating an example of another scenario to which one or more embodiments may be applied.

FIG. 17 schematically illustrates an example of a scenario to which a detection system 100E according to a fifth modification is applied. This modification is an example in which the embodiment described above is applied to a scenario in which principal component analysis is performed on sensing data acquired by a sensor SE for observing the state of a machine RE. The detection system 100E according to this modification includes the integrated analysis apparatus 1 and a plurality of detection apparatuses 2E. Similarly to the embodiment described above, the integrated analysis apparatus 1 and the detection apparatuses 2E may be connected via a network.

In this modification, local learning data 3E is sensing data obtained by a sensor SE. The type of the sensor SE is not limited in particular, and may be selected as appropriate according to the embodiment, as long as it is able to observe the state of a machine RE. The sensor SE may be a microphone, an acceleration sensor, or a vibration sensor, for example. Inferring the state of a machine RE includes determining whether or not an anomaly occurs in the machine RE, determining the probability that an anomaly occurs in the machine RE, identifying the type of anomaly that has occurred or may occur in the machine RE, or specifying the position at which an anomaly has occurred, or a combination of these. The types of machine RE and anomaly are not limited in particular, and may be selected as appropriate according to the embodiment. The machine RE may be an apparatus that constitutes a production line, such as a conveyor apparatus or an industrial robot. The machine RE may be the entirety of an apparatus, or may also be a part of an apparatus, such as a motor. The anomaly may be a failure, contamination, adhesion of smudge, or wear of a component, for example. The detection system 100E according to this modification may be similarly configured to the system 100 according to the embodiment, except for these restrictions.

(Detection Apparatus)

The detection apparatuses 2E according to this modification correspond to the client apparatuses 2 according to the embodiment described above. The hardware configuration and software configuration of the detection apparatus 2E according to this modification may be similar to those of the client apparatuses 2 according to the embodiment described above. Accordingly, the information processes of the detection apparatus 2E may be executed with a procedure similar to that of the client apparatuses 2.

In step S101 described above, the detection apparatuses 2E collect local learning data 3E. The local learning data 3E is constituted by a plurality of local samples of sensing data obtained by a sensor SE. In step S102 described above, the detection apparatuses 2E each calculate a result 51E of computation regarding a correlation between elements of the local learning data 3E. The detection apparatuses 2E can calculate autocorrelation matrices of the local learning data 3E as the results 51E of computation by executing the processes in steps S1021 to S1023 described above. In step S103, the detection apparatuses 2E output the calculated computation results 51E.

(Integrated Analysis Apparatus)

In this modification, the integrated analysis apparatus 1 derives one or more principal components 41E with respect to sensing data obtained by the sensors SE. Specifically, in step S201 described above, the integrated analysis apparatus 1 acquires the results 51E of computation regarding correlation from the detection apparatuses 2E. In step S202 described above, the integrated analysis apparatus 1 calculates an integration result 40E indicating the correlation between the elements of all of the local samples included in all of the local learning data, by integrating the computation results 51E acquired from the detection apparatuses 2E. With the computation process described above, the integrated analysis apparatus 1 can acquire a variance-covariance matrix of all of the local learning data as the integration result 40E. In step S203 described above, the integrated analysis apparatus 1 derives one or more principal components 41E from the calculated integration result 40E by executing principal component analysis. In step S204, the integrated analysis apparatus 1 outputs information regarding the one or more derived principal components 41E.

(Usage of Principal Components)

The one or more derived principal components 41E may be used in any application. Also, information regarding the one or more derived principal components 41E may be provided to the detection apparatuses 2E at any timing. The detection apparatuses 2E can compress object data using the one or more derived principal components 41E with the processes in steps S301 to S303 described above. Also, the detection apparatuses 2E can each identify the states of machines RE in object data using the calculated one or more principal components 41E, with the processes in steps S311 to S315.

In step S315 described above, the detection apparatuses 2E outputs information regarding the results of inferring the states of the machines RE. For example, the detection apparatuses 2E may output the results of inferring the states of the machines RE to output apparatuses as is. Also, when an occurrence of an anomaly in a machine RE has been detected based on the result of inferring the state of the machine RE, the corresponding detection apparatus 2E may output a warning notifying the occurrence of an anomaly to the output apparatus, for example. Furthermore, when the detection apparatuses 2E are configured to control the operations of the machines RE, if an occurrence of an anomaly is detected in a machine RE, the corresponding detection apparatus 2E may stop the operation of the machine RE in response thereto. In addition, the detection apparatuses 2E may output information indicating the type of anomalies occurred in the machines RE and maintenance methods for dealing with the anomalies to the output apparatuses. In this case, the information indicating the maintenance methods for dealing with anomalies may be saved in a predetermined storage area such as a storage unit, a storage medium, an external storage apparatus, or a storage media. The detection apparatuses 2E may acquire, as appropriate, the information indicating the maintenance methods for dealing with anomalies from the predetermined storage area.

(Features)

According to this modification, with respect to sensing data that can be used to detect anomalies in the machines RE, the quality of data analysis by principal component analysis can be improved while suppressing an increase in cost. Accordingly, in the case of data compression described above, as a result of using the one or more derived principal components 41E, information useful to detect anomalies in the machines RE can be hardly deleted. Also, in the case of inference described above, the accuracy of detecting anomalies in the machines RE can be improved with steps S312 to S314.

<4.2>

In at least one of the plurality of client apparatuses 2 according to the embodiment described above, the local samples 30 may be weighted based on the importance. Also, in at least one of the plurality of client apparatuses 2 according to the embodiment, two or more elements, of the plurality of elements constituting the local samples 30, on which principal component analysis is to be performed may be designated.

Figure 18:
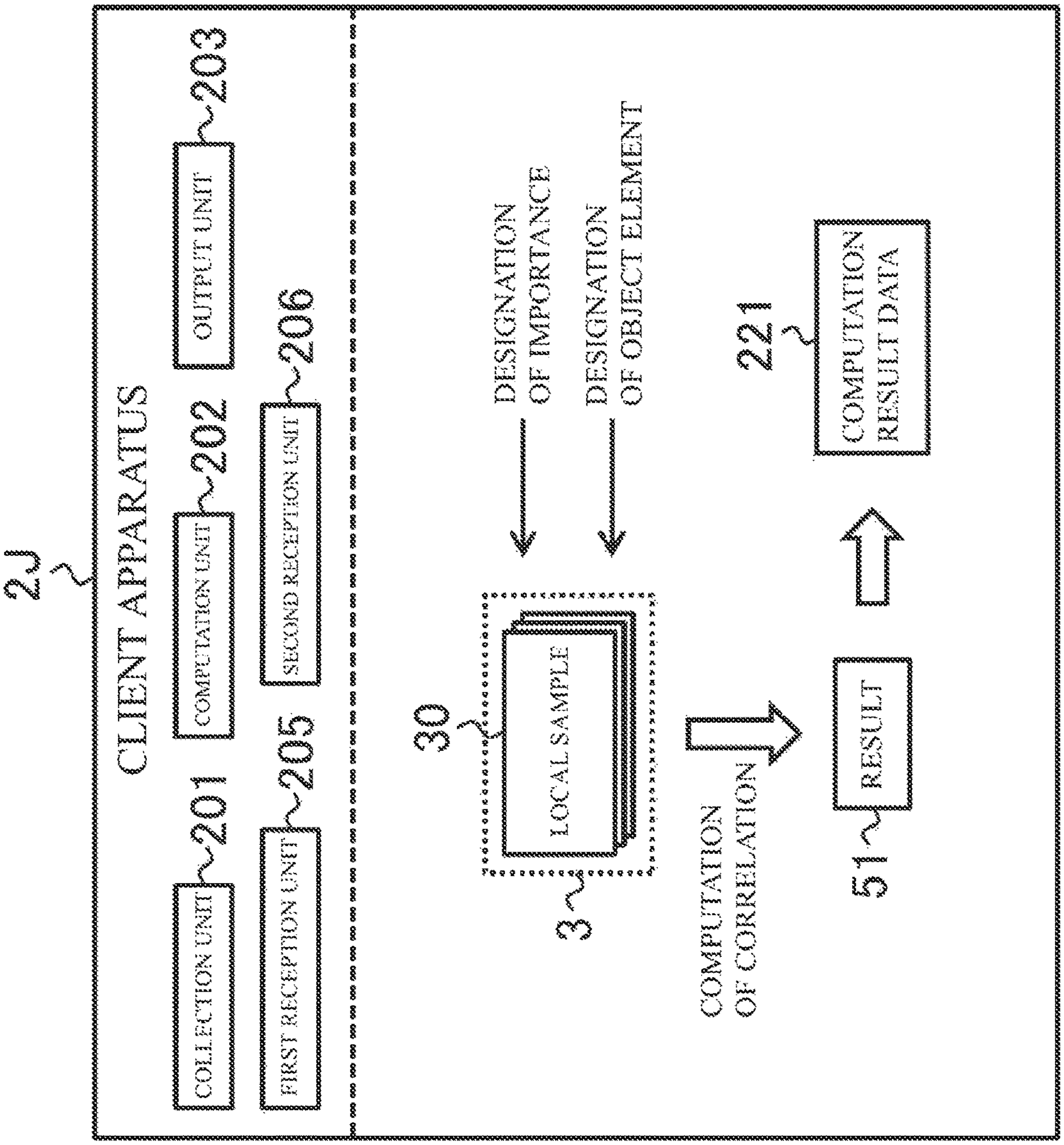
FIG. 18 is a schematic diagram illustrating an example of a software configuration of a client apparatus in one or more embodiments according to a modification.

FIG. 18 schematically illustrates an example of a software configuration of a client apparatus 2J according to this modification. The hardware configuration of the client apparatus 2J according to this modification may be similar to that of the client apparatus 2 according to the embodiment described above. A control apparatus of the client apparatus 2J interprets and executes commands included in a collection program by a CPU. Accordingly, the client apparatus 2J operates as a computer further including a first reception unit 205 and a second reception unit 206 as software modules. The first reception unit 205 receives designation of importances of the local samples 30. The second reception unit 206 receives designation of two or more elements from the plurality of elements constituting the local samples 30. The client apparatus 2J according to this modification is similarly configured to the client apparatus 2 according to the embodiment except for this point.

Figure 19:
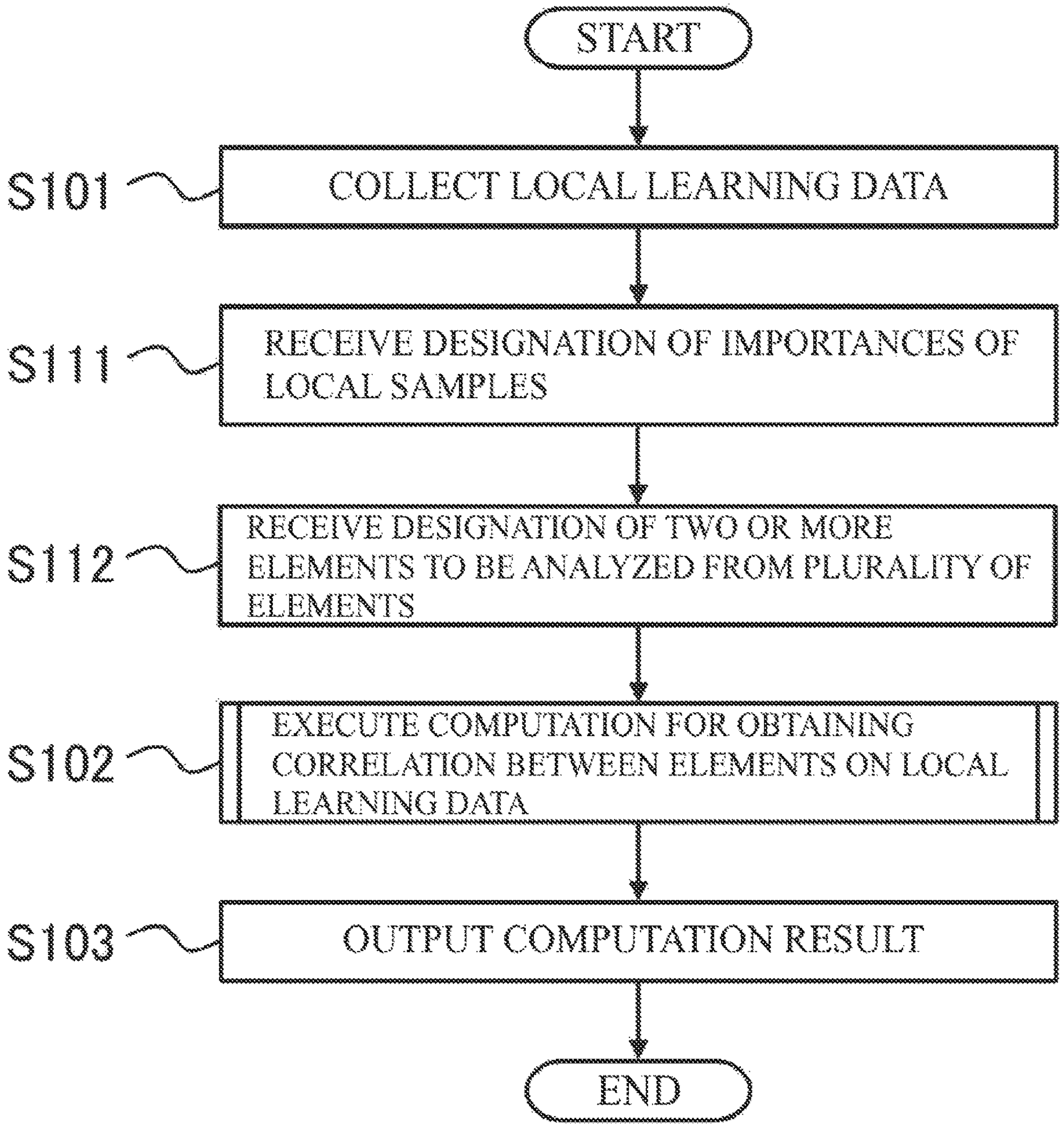
FIG. 19 is a diagram illustrating an example of a procedure of collecting local learning data to be executed by a client apparatus in one or more embodiments according to a modification.

FIG. 19 is a flowchart illustrating an example of a procedure regarding collection of local learning data 3 by the client apparatus 2J according to this modification. Note that the procedure described below is merely an example, and each step may be changed to the extent possible. Moreover, in the procedure described below, steps may also be omitted, replaced, or added as appropriate according to the embodiment.

In step S101, a control unit of the client apparatus 2J operates as the collection unit 201 and collects local learning data 3, similarly to the embodiment described above. In step S111, the control unit operates as the first reception unit 205, and receives designation of importances of the local samples 30. In step S112, the control unit operates as the second reception unit 206, and receives designation of two or more elements from the plurality of elements constituting the local samples 30. The process sequence in steps S111 and S112 is not limited to this example, and may be determined as appropriate according to the embodiment.

Figures 20, 21:
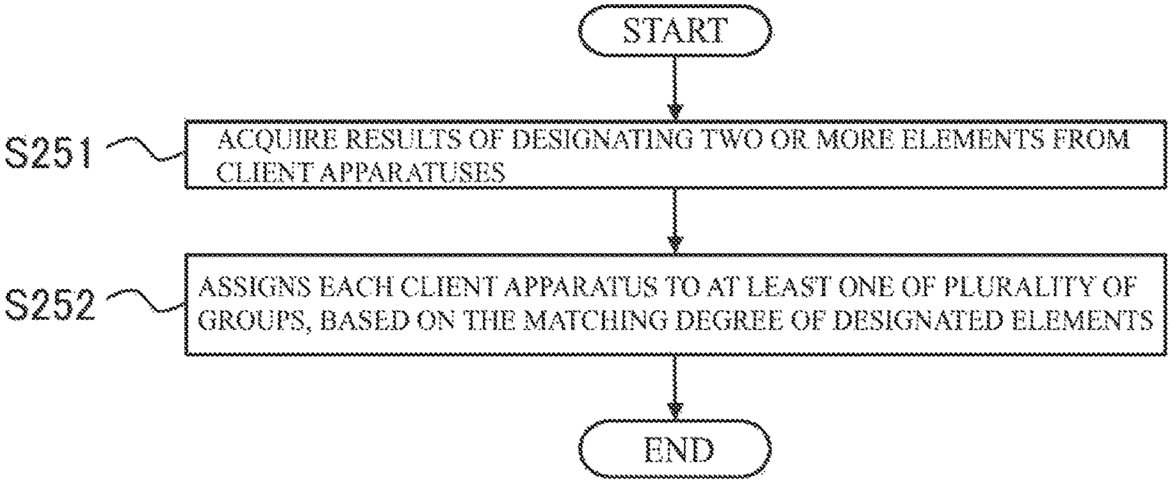
FIG. 20 is a schematic diagram illustrating an example of a screen for receiving a designation of importance and an element to be analyzed.
FIG. 21 is a diagram illustrating an example of a procedure of grouping client apparatuses to be executed by an integrated analysis apparatus in one or more embodiments according to a modification.

FIG. 20 schematically illustrates an example of a screen 250 for receiving a designation of importances and elements to be analyzed. When the client apparatus 2J includes a display as an output apparatus, the screen 250 illustrated in FIG. 20 may be displayed in the display. The screen 250 includes entry fields 251 and check boxes 252. The entry fields 251 are provided in correspondence with the local samples 30. Also, the check boxes 252 are provided in correspondence with the elements of the local samples 30.

In the example in FIG. 20, the entry fields 251 are configured such that the importances of the local samples 30 can be designated in five levels. Importance "5" is designated to a sample A, and importance "1" is designated to a sample B. Note that the designation method of importances and the number of levels are not limited to this example, and may be determined as appropriate according to the embodiment. The importance may be designated by a discrete value or a continuous value. Also, in the example in FIG. 20, the element to be analyzed can be designated by checking the corresponding check box 252. Note that the designation method of elements is not limited to this example, and may be determined as appropriate according to the embodiment.

An operator can designate the importances of the local samples 30 by manipulating the entry fields 251 via an input apparatus. Upon the importances of the local samples 30 being designated, the local samples 30 are weighted by the designated importances. Similarly, the operator can designate two or more elements to be analyzed by manipulating the check boxes 252 via the input apparatus. Note that the elements to be analyzed may be designated according to the task. For example, in the scenario of visual inspection described above, different elements may be designated to a first task for detecting a first defect and a second task for detecting a second defect as the elements to be analyzed. Accordingly, the elements appropriate for executing the task can be designated as the elements to be analyzed.

Upon completing designation of the importances and the elements to be analyzed, the control unit advances the processing to the next step S102. In the computations described above, $X_n^{(P)}$ is replaced by the following Formula 11, and $N^{(P)}$ is replaced by the following Formula 12. Also, the elements that are not designated (selected) are excluded from the computation. The control unit executes the process in step S102, similarly to the embodiment described above except for these points.

[Math. 11]

$$w_n^{(P)}X_n^{(P)} \qquad \text{Formula 11}$$

[Math. 12]

$$\sum_n w_n^{(P)} \qquad \text{Formula 12}$$

$w_n^{(P)}$ indicates the importance (weight) designated to an $n^{th}$ local sample 30 of local learning data 3 collected by a $P^{th}$ client apparatus 2. The control unit can generate a result 51 of computation regarding correlation on which the importance is reflected, with respect to the designated elements, with the process in step S102. In this modification, the average values of the respective elements of all of the local samples acquired in step S1021 described above are weighted average values in which weights are given according to the importances. As a result of executing the processes in steps S1021 to S1023 described above, the control unit can calculate an autocorrelation matrix on which the importance is reflected as the computation result 51, with respect to the designated elements. Note that exclusion of elements that are not designated may be performed in the integrated analysis apparatus 1, instead of the client apparatus 2J. In step S103, the control unit outputs the calculated computation result 51.

(Integrated Analysis Apparatus)

In accordance with the importance being designated, in step S202 described above, the control unit 11 can calculate a variance-covariance matrix of all of the local learning data, as an integration result 40, by dividing the sum of autocorrelation matrices by the sum of weights according to the importance. Also, as a result of the elements to be analyzed being designated, in step S202 described above, the control unit 11 calculates an integration result 40 by integrating the acquired computation results 51, with respect to the two or more designated elements. Also, in step S203 described above, the control unit 11 derives one or more principal components 41 from the calculated integration result 40 by performing principal component analysis, with respect to the designated two or more elements. The information processes of the integrated analysis apparatus 1 according to this modification may be similar to those of the embodiment described above, except for these points.

(Features)

According to this modification, priorities can be given to the local samples 30 based on the importance. The importance of an important local sample 30 can be increased, and the importance of a local sample 30 that is not important can be decreased. As a result of reflecting the importances of the local samples 30 that are designated in this way on principal component analysis, the quality of data analysis by principal component analysis can be improved. Also, according to this modification, two or more elements regarding which the principal component analysis is to be performed can be selected from the plurality of elements of the local samples 30. Accordingly, by excluding elements that are not highly relevant to the purpose such as task execution from the elements to be analyzed, the calculation cost incurred in the principal component analysis can be reduced, and principal components 41 appropriate for the purpose can be derived. Note that, in the software configuration of the client apparatus 2J according to this modification, at least one of the first reception unit 205 and the second reception unit 206 may be omitted. In accordance therewith, at least one of designation of importances and designation of elements to be analyzed may be omitted.

(Grouping)

It is highly possible that, as the similarity of elements designated to be analyzed increases, the purposes of use of the collected local learning data 3 becomes similar. Therefore, it is envisioned that, by integrating the computation results 51 calculated from the local learning data 3 collected by client apparatuses 2J regarding which the degree of similarity of the designated elements is high, one or more principal components 41 can be appropriately derived from the obtained integration result 40. Therefore, in this modification, the control unit 11 of the integrated analysis apparatus 1 operates as the grouping unit 115, and may perform grouping of the client apparatuses 2J based on the results of element designation.

FIG. 21 is a flowchart illustrating an example of a procedure of a grouping method using the results of element designation. When the grouping method shown in FIG. 21 is adopted as the method of group assignment, assigning each client apparatus 2J to at least one of a plurality of groups includes the processes in steps S251 and S252 below. Note that the procedure described below is merely an example, and each process may be changed to the extent possible. Moreover, in the procedure described below, steps may also be omitted, replaced, or added as appropriate according to the embodiment.

In step S251, the control unit 11 acquires the results of designating two or more elements from the client apparatuses 2J. The method of acquiring the designation results may be determined as appropriate according to the embodiment. In step S252, the control unit 11 assigns each client apparatus 2J to at least one of the plurality of groups, based on the matching degree of the two or more elements designated in the client apparatuses 2J. For example, the control unit 11 may assign client apparatuses 2J regarding which the designated elements completely match to the same group. Alternatively, the control unit 11 may assign client apparatuses 2J regarding which the matching degree of the designated elements exceeds a threshold value to the same group. The threshold value may be set as appropriate. With this, grouping of the client apparatuses 2J can be performed using the results of designating the elements to be analyzed.

In accordance with this grouping, in step S202 described above, the control unit 11 calculates an integration result 40 by integrating the computation results 51 acquired from the client apparatuses 2J in the same group, with respect to the two or more designated elements. Also, in step S203 described above, the control unit 11 derives one or more principal components 41 from the calculated integration result 40 by performing principal component analysis, with respect to the two or more elements designated in the same group.

Note that, when there is a client apparatus 2J, in the same group, for which the designated elements includes an element different from those of the others, in step S202 described above, the control unit 11 may integrate the computation results 51 acquired from the client apparatuses 2J, with respect to all of the elements designated in the client apparatuses 2J. Also, in step S203 described above, the control unit 11 may derive one or more principal components 41 from the calculated integration result 40, with respect to all of the designated elements. Alternatively, in step S203 described above, the control unit 11 may derive, for each client apparatus 2J, one or more principal components 41 from the calculated integration result 40, with respect to the designated two or more element.

<4.3>

In the embodiment described above, the client apparatuses 2 execute three information processes, namely collection of local learning data 3, data compression, and predetermined inference. However, the configuration of the client apparatuses 2 is not limited to this example. At least one of the plurality of client apparatuses 2 may be constituted by a plurality of computers. In this case, the information processes may be executed in different computers.

Figure 22:
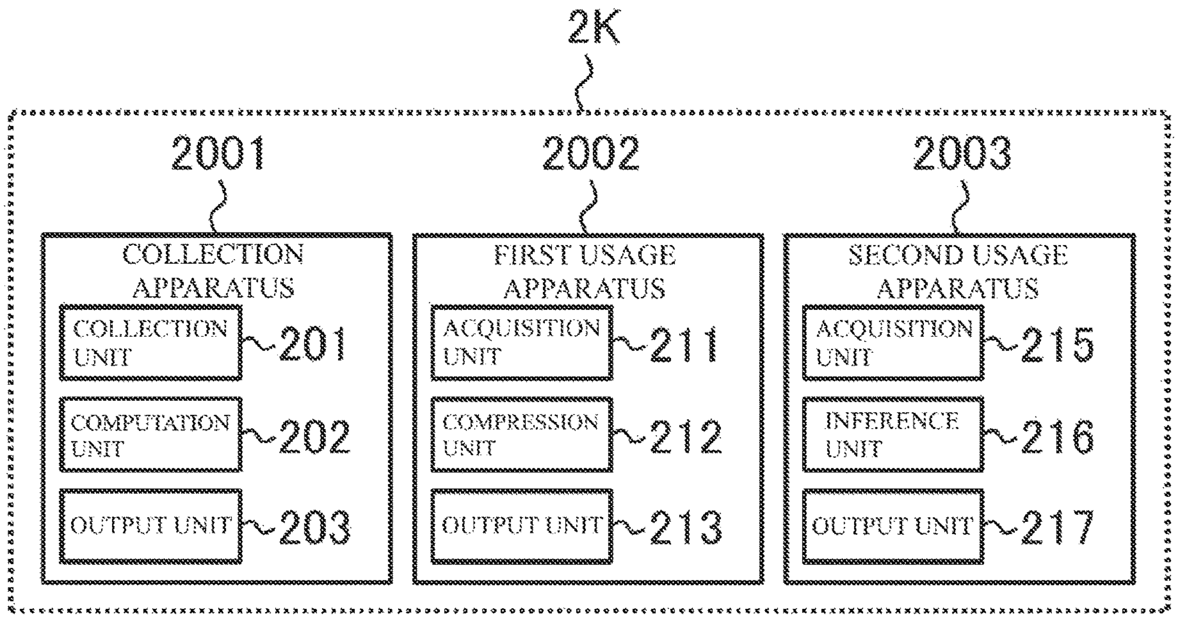
FIG. 22 is a schematic diagram illustrating an example of a software configuration of a client apparatus according in one or more embodiments to a modification.

FIG. 22 schematically illustrates an example of a configuration of a client apparatus 2K according to this modification. In this modification, the client apparatus 2K includes a collection apparatus 2001, a first usage apparatus 2002, and a second usage apparatus 2003. The hardware configurations of the collection apparatus 2001, the first usage apparatus 2002, and the second usage apparatus 2003 are similar to those of the client apparatuses 2 according to the embodiment described above. The collection apparatus 2001 operates as a computer including a collection unit 201, a computation unit 202, and an output unit 203 as software modules, by executing a collection program 85. The first usage apparatus 2002 operates as a computer including an acquisition unit 211, a compression unit 212, and an output unit 213 as software modules, by executing a compression program 86. The second usage apparatus 2003 operates as a computer including an acquisition unit 215, inference unit 216, and an output unit 217 as software modules, by executing an inference program 87.

Note that the computer that uses one or more derived principal components 41 is not limited to the client apparatuses 2. The one or more derived principal components 41 may be used by a computer other than the client apparatuses 2. The other computer may include the integrated analysis apparatus 1 described above. Also, the usage of one or more derived principal components 41 is not limited to aforementioned data compression and predetermined inference. One or more derived principal components 41 may be used in any application.

<4.4>

In the embodiment described above, the average value U of the elements of all of the local samples is calculated using the number of local samples 30 and the average values of the respective elements of the local samples 30 of the client apparatuses 2, in the process of calculating a computation result 51 in step S102. Also, in step S202 described above, the computation results 51 obtained from the client apparatuses 2 are integrated. These data relate to the local learning data 3. Therefore, if these data are disclosed, it is possible that the confidentiality of the local learning data 3 of the client apparatuses 2 is lost. Therefore, in order to improve the confidentiality of the local learning data 3, secret calculation may be used in the computations. The average value U of the elements of all of the local samples may be calculated by secret calculation in which the number of local samples 30 and the average values of the respective elements of the local samples 30 obtained from the client apparatuses 2 are used. Also, integration of the computation result 51 may be performed by secret calculation. The method of secret calculation is not limited in particular, and may be selected as appropriate according to the embodiment. In this modification, the control unit 11 can perform secret calculation using one of the following two methods.

(A) Method for Using Secret Sharing

Figure 23:
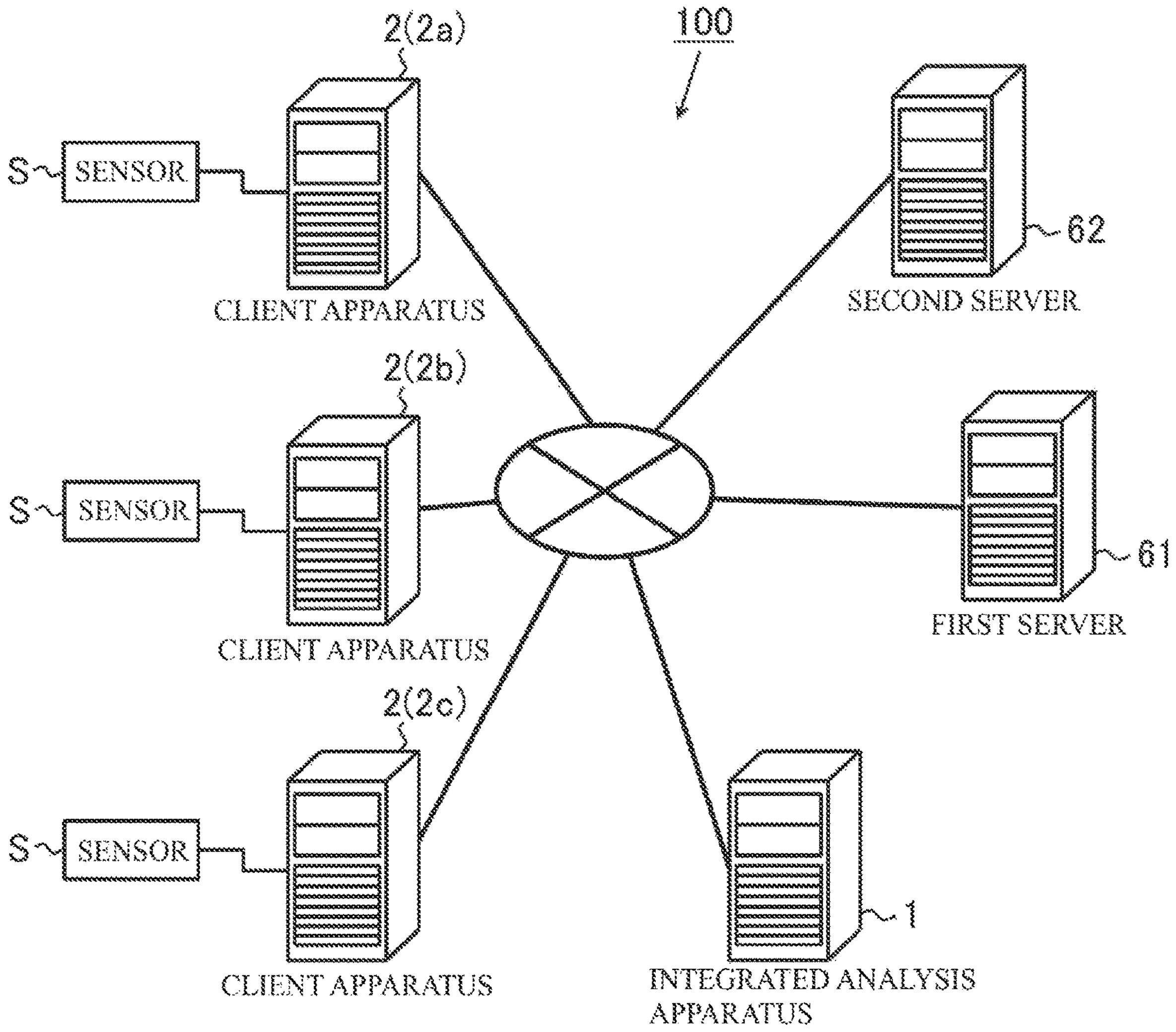
FIG. 23 is a schematic diagram illustrating an example of a scenario of performing secret calculation in one or more embodiments according to a modification.

FIG. 23 schematically illustrates an example of a scenario in which a secret calculation is executed using secret sharing. In the method for using the secret sharing, a first server 61 and a second server 62 are installed in a network, as reliable third party apparatuses. The first server 61 and the second server 62 are each a computer including a hardware processor and a memory, similarly to the integrated analysis apparatus 1 or the like.

In this method, first, the control unit 21 of each client apparatus 2 generates a random number when transmitting the computation results thereof to another computer. The scene of transmitting the own computation result to another computer is a scene of transmitting the number of local samples 30 and the average values of the respective elements of the local samples 30 in the embodiment described above (in the following, this may also be referred to as a "first scene"), and a scene of transmitting the computation result 51 (in the following, this may also be referred to as a "second scene"). In the first scene, the other computer is a computer that calculates an average value U of the elements of all of the local samples (e.g., integrated analysis apparatus 1, another client apparatus 2). Also, in the second scene, the other computer is the integrated analysis apparatus 1. The method of generating the random number may be selected as appropriate according to the embodiment.

Next, the control unit 21 calculates the difference between the value of the computation result to be transmitted and the generated random number. In the first scene, the computation result to be transmitted includes two elements, namely the products of the number of local samples 30 and the average values of the respective elements thereof, and the number of local samples 30. The control unit 21 calculates the differences between these values and the random number. The random number from which the differences of these values are calculated may be the same or different. In the second scene, the computation result to be transmitted includes two elements, namely the results 51 of computation regarding correlation and the number of local samples 30. Similarly to the first scene, the control unit 21 calculates the differences between these values and the random number. The random number from which the differences of these values are calculated may be the same or different. Then, the control unit 21 transmits the calculated differences to the first server 61, and transmits the generated random number to the second server 62.

In response thereto, the first server 61 calculates the total sum of the differences received from the client apparatuses 2, as shown in the following Formula 13. Meanwhile, the second server 62 calculates the total sum of the random numbers received from the client apparatuses 2, as shown in the following Formula 14.

[Math. 13]

$$\Sigma_P(Y^{(P)}-s^{(P)}) \quad \text{Formula 13}$$

[Math. 14]

$$\Sigma_P s^{(P)} \quad \text{Formula 14}$$

Note that $Y^{(P)}$ indicates the value of the computation result by a $P^{th}$ client apparatus 2. In the first scene, $Y^{(P)}$ indicates two elements, namely the product of the number of local samples 30 and the average values of the respective elements thereof ($N^{(P)}U^{(P)}$), and the number of local samples 30 $N^{(P)}$. These are separately calculated. Meanwhile, in the second scene, $Y^{(P)}$ indicates two elements, namely the results 51 of computation regarding correlation ($Q^{(P)}$) and the number of local samples 30 $N^{(P)}$. These are separately calculated. $s^{(P)}$ indicates the random number generated by a $P^{th}$ client apparatus 2.

The first server 61 and the second server 62 transmit the calculation results of total sum to another computer. The other computer adds the calculation results of total sum received from the first server 61 and the second server 62. With this, the other computer can calculate the total sum of the computation results while the other computer is prevented from specifying the computation results of the client apparatuses 2. In the first scene, the client apparatuses 2 can obtain the computation result of Formula 4. In the second scene, the integrated analysis apparatus 1 can obtain the computation result of Formula 7.

Note that the method of secret sharing is not limited in particular, and may be selected as appropriate according to the embodiment. The international standard method (ISO/IEC 19592-2:2017) or the like may be used as the secret sharing. If the integrated analysis apparatus 1 is a reliable server, the integrated analysis apparatus 1 may also operate as one of the first server 61 and the second server 62. Also, the first server 61 and the second server 62 may be constituted by the same computer.

(B) Method of Using Homomorphic Encryption

Figure 24:
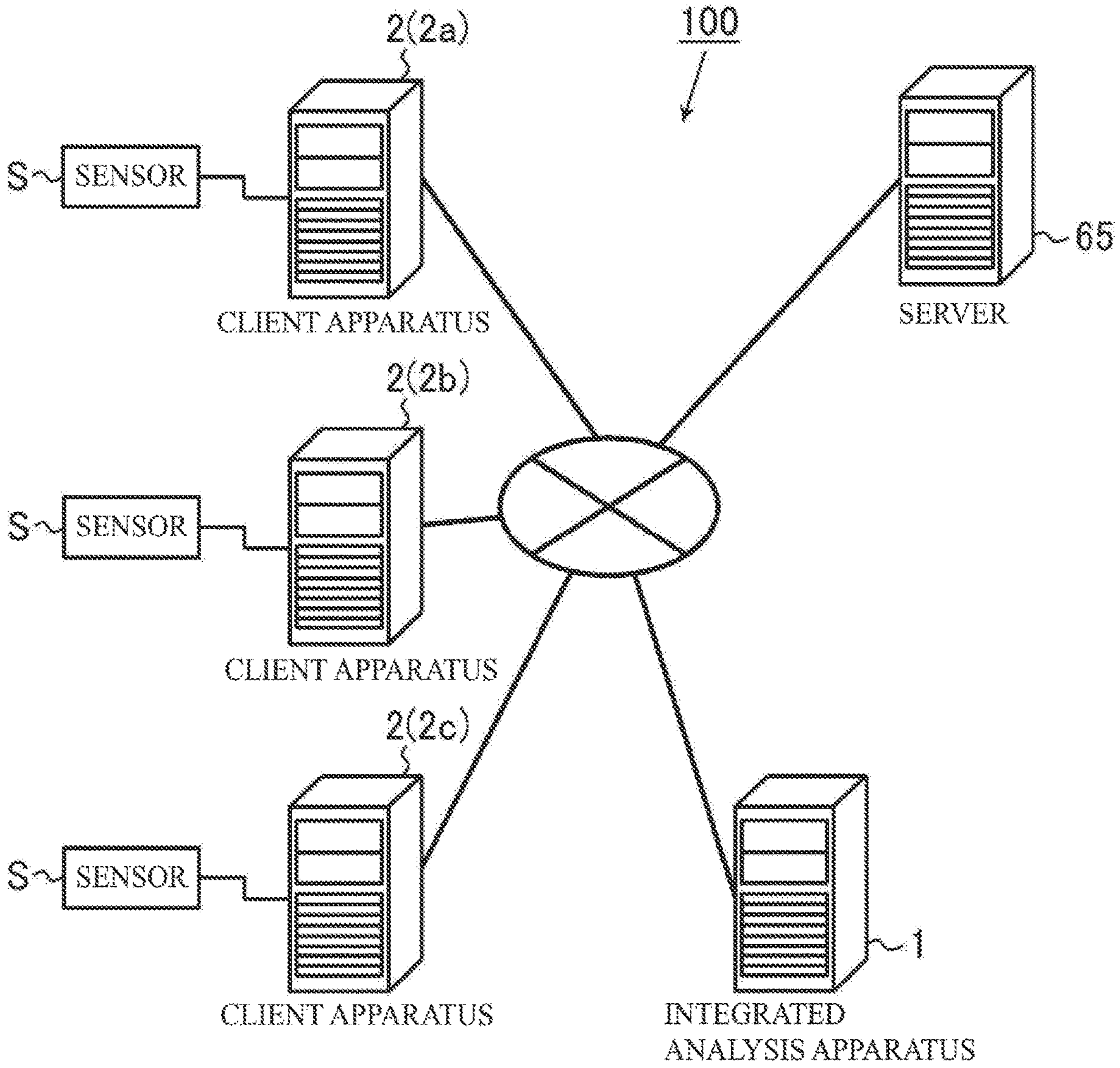
FIG. 24 is a schematic diagram illustrating an example of a scenario of performing secret calculation in one or more embodiments according to a modification.

FIG. 24 schematically illustrates an example of a scenario in which a secret calculation is executed using homomorphic encryption. In the method of using homomorphic encryption, a server 65 is installed in a network, as a reliable third party apparatus. The server 65 is a computer including a hardware processor and a memory, similarly to the integrated analysis apparatus 1, for example.

In this method, first, the server 65 issues a public key and a private key. The public key is generated with homomorphism. That is, the public key is generated such that, when two encoded texts that have been encrypted by the public key are given, the two encoded texts can be added directly in an encrypted state. The server 65 distributes the public key, of the issued public key and private key, to each client apparatus 2.

The control unit 21 of each client apparatus 2 encrypts its own computation result with the received public key. Then, the control unit 21 transmits the encrypted computation result to another computer. The other computer calculates the total sum of the values of the computation results received from the respective client apparatuses 2 directly in an encrypted state, as in the following Formula 15.

[Math. 15]

$$H(\Sigma_P Y^{(P)}) \quad \text{Formula 15}$$

Note that H represents encryption by a public key.

The other computer transmits the encrypted total sum to the server 65. The server 65 decrypts the encrypted total sum received from the other computer with the private key. Also, the server 65 returns the decrypted total sum of computation results to the other computer. With this, the other computer can calculate the total sum of the computation results while the other computer is prevented from specifying the computation results of the respective client apparatuses 2. In the first scene, the client apparatuses 2 can obtain the computation result of Formula 4. In the second scene, the integrated analysis apparatus 1 can obtain the computation result of Formula 7.

Note that the method of homomorphic encryption is not limited in particular, and may be selected as appropriate according to the embodiment. Modified-ElGamal encryption, Paillier encryption, or the like may be used as the homomorphic encryption method. Also, if the integrated analysis apparatus 1 is a reliable server, the integrated analysis apparatus 1 may also operate as the server 65.

As described above, according to this modification, with one of the two methods described above, the total sums of Formulas 4 and 7 can be calculated by the secret calculation. Accordingly, the confidentiality of the local learning data 3 in the client apparatuses 2 can be improved.

<4.5>

In the embodiment described above, the process of grouping the client apparatuses 2 may be omitted. In response thereto, the grouping unit 115 may be omitted from the software configuration of the integrated analysis apparatus 1. Also, the processes of the steps described above may be executed by different computers. For example, the process in step S101 described above and the process in step S102 may be executed by different computers.

INDEX TO THE REFERENCE NUMERALS

1 Integrated analysis apparatus
11 Control unit
12 Storage unit
13 Communication interface
14 Input apparatus
15 Output apparatus
16 Drive
111 Acquisition unit
112 Integration unit
113 Analysis unit
114 Output unit
115 Grouping unit
121 Principal component information
123 Group list
124 Assignment information
81 Integrated analysis program
91 Storage medium
2 Client apparatus
21 Control unit
22 Storage unit
23 Communication interface
24 Input apparatus
25 Output apparatus
26 Drive
27 External interface
201 Collection unit
202 Computation unit
203 Output unit
211 Acquisition unit
212 Compression unit
213 Output unit
215 Acquisition unit
216 Inference unit
217 Output unit
221 Computation result data
223 Object data
224 Compressed data
226 Object data
227 Data group
228 Sample
85 Collection program
86 Compression program
87 Inference program
92 Storage medium
3 Local learning data
30 Local sample
40 Integration result
41 Principal component
51 (Computation) Result

The invention claimed is:

1. An integrated analysis method comprising:

executing computation of an autocorrelation matrix, by each of a plurality of client apparatuses, on local learning data, comprising image data of images of products, or measurement data obtained by measuring attributes of products, for obtaining a correlation between elements in local samples comprised in the local learning data, the computation of the autocorrelation matrix, by each of the plurality of client apparatuses, comprising:

acquiring average values of respective elements of all of the local samples comprised in all of the local learning data;

normalizing the local samples comprised in the local learning data by subtracting the acquired average values from the values of the elements of the local samples; and executing the computation of the autocorrelation matrices of the local learning data from the normalized local samples;

acquiring, by a server apparatus, results of the computation from the client apparatuses by acquiring the calculated autocorrelation matrices;

calculating, by the server apparatus, an integration result indicating a correlation between elements of all of the local samples of all of the local learning data, by:

integrating the results of the computation of the autocorrelation matrices acquired from the client apparatuses;

summing the respective autocorrelation matrices acquired from the plurality of client apparatuses and dividing by a total of a number of the respective local samples minus one; and calculating a variance-covariance matrix as the integration result;

deriving, by the server apparatus, one or more principal components from the calculated integration result by:

performing principal component analysis for the entirety of the local learning data based on the integration result;

performing eigenvalue decomposition on the calculated variance-covariance matrix; and outputting, by the server apparatus, information regarding the one or more derived principal components.

2. The integrated analysis method according to claim 1, further comprising:

receiving, by the client apparatuses, a designation of importances of the local samples, wherein the local samples are weighted according to the designated importances, the average values of the elements of all of the local samples are weighted average values that are weighted according to the importances, and calculating the integration result further comprises calculating, by the server apparatus, the variance-covariance matrix of all of the local learning data as the integration result, by dividing the sum of the calculated autocorrelation matrices by sum of weights according to the importances.

3. The integrated analysis method according to claim 2, wherein acquiring average values of respective elements of all of the local samples comprises calculating the average values of the elements of all of the local samples by secret calculation using the number of the local samples and the average values of the respective elements that are obtained from each client apparatus.

4. The integrated analysis method according to claim 3, wherein integrating the results of the computation comprises integrating the results of the computation by secret calculation.

5. The integrated analysis method according to claim 2, further comprising:

receiving, by the client apparatuses, a designation of two or more elements from a plurality of elements that constitute the local samples, wherein, calculating, by the server apparatus, the integration result comprises calculating the integration result by integrating the results of computation acquired from the client apparatuses, regarding the two or more designated elements, and deriving by the server apparatus, the one or more principal components comprises deriving the one or more principal components from the calculated integration result by performing principal component analysis, regarding the two or more designated elements.

6. The integrated analysis method according to claim 5, further comprising:

assigning, by the server apparatus, each client apparatus to at least one of a plurality of groups, based on a matching degree of the designated two or more elements, wherein, calculating, by the server apparatus, the integration result comprises calculating the integration result by integrating the results of computation acquired from the client apparatuses in the same group, regarding the two or more designated elements, and deriving by the server apparatus, the one or more principal components comprises deriving the one or more principal components from the integration result calculated in the same group, regarding the two or more designated elements, by performing principal component analysis.

7. The integrated analysis method according to claim 2, further comprising:

assigning, by the server apparatus, each client apparatus to at least one of a plurality of groups, wherein, calculating, by the server apparatus, the integration result comprises calculating the integration result by integrating the results of computation acquired from the client apparatuses in the same group, and deriving, by the server apparatus, the one or more principal components comprises deriving the one or more principal components from the integration result calculated in the same group, by performing principal component analysis.

8. The integrated analysis method according to claim 7, wherein, assigning, by the server apparatus each client apparatus to at least one of a plurality of groups comprises distributing, by the server apparatus, a list indicating the plurality of groups to each client apparatus, causing the client apparatus to select one or more groups from the plurality of groups shown in the list, and assigning the client apparatus to the selected one or more groups.

9. The integrated analysis method according to claim 7, wherein, assigning, by the server apparatus each client apparatus to at least one of a plurality of groups comprises acquiring attribute data regarding the local learning data from the client apparatuses, performing clustering on the attribute data acquired from the client apparatuses, and assigning each client apparatus to at least one of the plurality of groups based on the clustering result.

10. The integrated analysis method according to claim 2, wherein acquiring average values of respective elements of all of the local samples comprises calculating the average values of the elements of all of the local samples by secret calculation using the number of the local samples and the average values of the respective elements that are obtained from each client apparatus.

11. The integrated analysis method according to claim 2, wherein integrating the results of the computation comprises integrating the results of the computation by secret calculation.

12. The integrated analysis method according to claim 1, wherein integrating the results of the computation comprises integrating the results of the computation by secret calculation.

13. The integrated analysis method according to claim 1, wherein outputting, by the server apparatus, the information regarding the one or more principal components comprises distributing, by the server apparatus, information regarding the one or more derived principal components to the client apparatuses.

14. The integrated analysis method according to claim 1, wherein the local learning data further comprises sensing data obtained by a sensor that observes states of subjects.

15. The integrated analysis method according to claim 1, further comprising:

receiving, by the client apparatuses, a designation of two or more elements from a plurality of elements that constitute the local samples, wherein, calculating, by the server apparatus, the integration result comprises calculating the integration result by integrating the results of the computation of the autocorrelation matrices acquired from the client apparatuses, regarding the two or more designated elements, and deriving, by the server apparatus, the one or more principal components comprises deriving the one or more principal components from the calculated integration result by performing principal component analysis only on the calculated integration results, regarding the two or more designated elements.

16. An integrated analysis apparatus comprising a processor configured to perform operations comprising:

acquiring, from each of a plurality of client apparatuses, a result of computation of an autocorrelation matrix executed on local learning data collected by the client apparatus, the local learning data being comprising image data of images of products or measurement data obtained by measuring attributes of products, the computation being for obtaining a correlation between elements in local samples comprised in the local learning data, the autocorrelation matrices comprising normalized average values of respective elements of all of the local samples comprised in all of the local learning data in which the average values are subtracted from the values of the elements of all of the local samples;

calculating an integration result indicating a correlation between elements of all of the local samples comprised in all of the local learning data, by:

integrating the results of the computation of the autocorrelation matrices acquired from the client apparatuses;

summing the respective autocorrelation matrices acquired from the plurality of client apparatuses and dividing by a total of a number of the respective local samples minus one; and calculating a variance-covariance matrix as the integration result;

deriving one or more principal components from the calculated integration result by:

performing principal component analysis for the entirety of the local learning data based on the integration result; and performing eigenvalue decomposition on the calculated variance-covariance matrix; and outputting information regarding the one or more derived principal components.

17. A non-transitory computer-readable medium, storing an integrated analysis program, which when read an executed, for causing a computer to perform operations comprising:

acquiring, from each of a plurality of client apparatuses, a result of computation of an autocorrelation matrix executed on local learning data collected by the respective client apparatus, the local learning data comprising image data of images of products or measurement data obtained by measuring attributes of products, the computation being for obtaining a correlation between elements in local samples comprised in the local learning data, the autocorrelation matrices comprising normalized average values of respective elements of all of the local samples comprised in all of the local learning data in which the average values are subtracted from the values of the elements of all of the local samples;

calculating an integration result indicating a correlation between elements of all of the local samples comprised in all of the local learning data, by:

integrating the results of the computation of the autocorrelation matrices acquired from the client apparatuses;

summing the respective autocorrelation matrices acquired from the plurality of client apparatuses and dividing by a total of a number of the respective local samples minus one; and calculating a variance-covariance matrix as the integration result;

deriving one or more principal components from the calculated integration result by:

performing principal component analysis for the entirety of the local learning data based on the integration result; and performing eigenvalue decomposition on the calculated variance-covariance matrix; and outputting information regarding the one or more derived principal components.

* * * * *